US012190835B2

(12) United States Patent
Ma et al.

(10) Patent No.: US 12,190,835 B2
(45) Date of Patent: Jan. 7, 2025

(54) ELECTRONIC PAPER DISPLAY APPARATUS, DRIVING METHOD THEREOF AND COMPUTER-READABLE STORAGE MEDIUM

(71) Applicants: Chongqing BOE Smart Electronics System Co.,Ltd., Chongqing (CN); BOE TECHNOLOGY GROUP CO., LTD., Beijing (CN)

(72) Inventors: Senlei Ma, Beijing (CN); Lichun Chen, Beijing (CN); Qiangeng Cheng, Beijing (CN); Kaijun Deng, Beijing (CN); Yuanzhuo Liu, Beijing (CN); Jun Wu, Beijing (CN); Lianghui Shi, Beijing (CN)

(73) Assignees: Chongqing BOE Smart Electronics System Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/280,985

(22) PCT Filed: Oct. 29, 2021

(86) PCT No.: PCT/CN2021/127274

§ 371 (c)(1),
(2) Date: Sep. 8, 2023

(87) PCT Pub. No.: WO2023/070494

PCT Pub. Date: May 4, 2023

(65) Prior Publication Data

US 2024/0169940 A1 May 23, 2024

(51) Int. Cl.
*G09G 3/34* (2006.01)

(52) U.S. Cl.
CPC ............... *G09G 3/344* (2013.01); *G09G 3/34* (2013.01); *G09G 2320/0257* (2013.01)

(58) Field of Classification Search
CPC ... G09G 3/34; G09G 3/344; G09G 2320/0257
See application file for complete search history.

(56) References Cited

U.S. PATENT DOCUMENTS

2011/0063340 A1* 3/2011 Umezaki ............... G09G 3/344 345/690
2012/0262496 A1* 10/2012 Swic ..................... G09G 3/344 345/690

(Continued)

FOREIGN PATENT DOCUMENTS

CN 107633819 A 1/2018
CN 109599067 A 4/2019

(Continued)

*Primary Examiner* — Nitin Patel
*Assistant Examiner* — Cory A Almeida
(74) *Attorney, Agent, or Firm* — HOUTTEMAN LAW LLC

(57) ABSTRACT

A driving method of an electronic paper display apparatus, including: inputting, by a controller, a first driving signal to a pixel electrode of a pixel driving circuit corresponding to a pixel which is required to display black, according to an image to be displayed; and inputting, by the controller, a second driving signal to a pixel electrode of a pixel driving circuit corresponding to a pixel which is required display white, according to the image to be displayed. A driving stage of the electronic paper display apparatus comprises a first homogenization stage which comprises a plurality of homogenization sub-stages. At a last homogenization sub-stage, the first and second driving signals comprise first and second driving sub-signals, respectively. Voltages of the first driving sub-signal and the second driving sub-signal have polarities opposite to polarities of the black particles and the white particles, respectively.

17 Claims, 14 Drawing Sheets

(56) References Cited

U.S. PATENT DOCUMENTS

| | | | | |
|---|---|---|---|---|
| 2019/0212626 | A1* | 7/2019 | Chiu | G02F 1/1685 |
| 2020/0074904 | A1* | 3/2020 | Feng | G09G 3/20 |

FOREIGN PATENT DOCUMENTS

| | | | |
|---|---|---|---|
| CN | 110780505 | A | 2/2020 |
| CN | 111402818 | A | 7/2020 |
| CN | 111508442 | A | 8/2020 |
| CN | 111599317 | A | 8/2020 |
| CN | 111951738 | A | 11/2020 |
| CN | 113450729 | A | 9/2021 |
| JP | 2011059525 | A | 3/2011 |

* cited by examiner

ELECTRONIC PAPER DISPLAY APPARATUS, DRIVING METHOD THEREOF AND COMPUTER-READABLE STORAGE MEDIUM

TECHNICAL FIELD

The present disclosure relates to the field of display technology, and in particular, to an electronic paper display apparatus, a driving method thereof, and a non-transitory computer-readable storage medium.

BACKGROUND

An electronic paper (E-paper, also called electronic ink) display apparatus has been widely concerned because of its eye-protecting and power-saving effects.

The electronic paper display apparatus includes a controller, a base substrate, a plurality of pixel driving circuits on the base substrate, and an electronic paper film, where the electronic paper film includes a plurality of microstructures, and the pixel driving circuits include a common electrode and a plurality of pixel electrodes among the plurality of microstructures. Red electrophoretic particles are encapsulated in the microstructures. The controller controls a movement of the electrophoretic particles by controlling an electric field generated by the common electrode and the pixel electrode. The controller controls the plurality of microstructures to display different colors, by applying different electric fields to the electrophoretic particles of various colors, so that the display can be realized.

SUMMARY

The present disclosure aims to solve at least one technical problem in the prior art and provides an electronic paper display apparatus, a driving method thereof, and a non-transitory computer-readable medium.

In a first aspect, the present disclosure provides a driving method of an electronic paper display apparatus, where the electronic paper display apparatus includes a controller, a base substrate, a plurality of pixel driving circuits on the base substrate, and an electronic paper film, where the electronic paper film includes a plurality of microstructures, and the plurality of pixel driving circuits includes a common electrode and a plurality of pixel electrodes among the plurality of microstructures; each of the plurality of microstructures includes black particles, white particles, and color particles; where charges of the black particles have a polarity opposite to a polarity of charges of the white particles and the same as a polarity of charges of the color particles, and a charge-to-mass ratio of the black particles is greater than a charge-to-mass ratio of the color particles; where the driving method includes: inputting, by the controller, a first driving signal to the pixel electrode of the pixel driving circuit corresponding to a pixel which is required to display black, according to an image to be displayed; and inputting, by the controller, a second driving signal to the pixel electrode of the pixel driving circuit corresponding to a pixel which is required display white, according to the image to be displayed; where a driving stage of the electronic paper display apparatus includes a first homogenization stage, and the first homogenization stage includes a plurality of homogenization sub-stages; at a last one of the plurality of homogenization sub-stages, the first driving signal includes a first driving sub-signal, and the second driving signal includes a second driving sub-signal; and a voltage of the first driving sub-signal has a polarity opposite to the polarity of the black particles; and a voltage of the second driving sub-signal has a polarity opposite to the polarity of the white particles.

The driving method further includes: inputting, by the controller, a third driving signal to the pixel electrode of the pixel driving circuit corresponding to a pixel which is required to display a color, according to the image to be displayed; where at the last one of the plurality of homogenization sub-stages of the first homogenization stage, the third driving signal includes a third driving sub-signal; and a voltage of the third driving sub-signal has a polarity opposite to the polarity of the color particles.

The driving stage of the electronic paper display apparatus further includes a second homogenization stage, and the second homogenization stage is before the first homogenization stage; the first driving signal further includes a fourth driving sub-signal at the second homogenization stage, the second driving signal further includes a fifth driving sub-signal at the second homogenization stage, and the third driving signal further includes a sixth driving sub-signal at the second homogenization stage; and the fourth driving sub-signal, the fifth driving sub-signal, and the sixth driving sub-signal each include a first voltage and a second voltage; where an effective duration of the second voltage is greater than an effective duration of the first voltage.

The driving stage of the electronic paper display apparatus further includes a third homogenization stage, and the third homogenization stage is between the second homogenization stage and the first homogenization stage; the first driving signal further includes a seventh driving sub-signal at the third homogenization stage, the second driving signal further includes an eighth driving sub-signal at the third homogenization stage, and the third driving signal further includes a ninth driving sub-signal at the third homogenization stage; and the seventh driving sub-signal, the eighth driving sub-signal and the ninth driving sub-signal each include pulse signals with positive and negative voltages sequentially alternated.

In the pulse signals of each of the seventh driving sub-signal, the eighth driving sub-signal, and the ninth driving sub-signal, an effective duration of the negative voltage is greater than an effective duration of the positive voltage.

The driving stage of the electronic paper display apparatus further includes a fourth homogenization stage, and the fourth homogenization stage is before a display stage of the electronic paper display apparatus; the first driving signal further includes a tenth driving sub-signal at the fourth homogenization stage, the second driving signal further includes an eleventh driving sub-signal at the fourth homogenization stage, and the third driving signal further includes a twelfth driving sub-signal at the fourth homogenization stage; the tenth driving sub-signal and the eleventh driving sub-signal each include pulse signals with negative and positive voltages sequentially alternated; the pulse signals of the twelfth driving sub-signal and the tenth driving sub-signal are inverse to the pulse signals of the tenth driving sub-signal; and a voltage of the common electrode of the pixel driving circuit includes pulse signals with negative and positive voltages sequentially alternated, and an absolute value of the voltage the common electrode is the same as an absolute value of the pixel electrode, in a same pixel driving circuit.

The driving stage of the electronic paper display apparatus further includes a balance stage, and the balance stage is before the fourth homogenization stage; the first driving signal further includes a thirteenth driving sub-signal at the balance stage, the second driving signal further includes a fourteenth driving sub-signal at the balance stage, and the third driving signal further includes a fifteenth driving sub-signal at the balance stage; and the thirteenth driving sub-signal and the fourteenth driving sub-signal are capable of driving the white particles in the microstructure back to initial positions; and the fifteenth driving sub-signal is capable of driving the white particles and the color particles in the microstructures back to initial positions.

The display stage includes a first display sub-stage, a second display sub-stage, and a third display sub-stage; the first driving signal further includes a sixteenth driving sub-signal at the first display sub-stage, the second driving signal further includes a seventeenth driving sub-signal at the first display sub-stage, and the third driving signal further includes an eighteenth driving sub-signal at the second display sub-stage and the third display sub-stage; the sixteenth driving sub-signal includes a first voltage and a zero voltage which are alternately arranged; the seventeenth driving sub-signal includes the zero voltage and a second voltage which are alternately arranged; and the eighteenth driving sub-signal includes the second voltage, the zero voltage, and a third voltage; where an effective duration of the third voltage is greater than a duration of the second voltage.

The second display sub-stage and the third display sub-stage are sequentially after the first display sub-stage.

Starting moments of driving of the plurality of homogenization sub-stages of the first homogenization stage sequentially increases, and the plurality of homogenization sub-stages are a first homogenization sub-stage, a second homogenization sub-stage, a third homogenization sub-stage and a fourth homogenization sub-stage; the first driving signal further includes a nineteenth driving sub-signal at the first homogenization sub-stage and the second homogenization sub-stage; the second driving signal further includes a twenty-first driving sub-signal at the first homogenization sub-stage and the second homogenization sub-stage; and the third driving signal further includes a twenty-third driving sub-signal at the first homogenization sub-stage and the second homogenization sub-stage; and the nineteenth driving sub-signal, the twenty-first driving sub-signal and the twenty-third driving sub-signal each include pulse signals with positive and negative voltages sequentially altered.

In the pulse signals of each of the nineteenth driving sub-signal, the twenty-first driving sub-signal, and the twenty-third driving sub-signal, a duration of the positive voltage is less than a duration of the negative voltage.

The first driving signal further includes a twentieth driving sub-signal at the third homogenization sub-stage; the second driving signal further includes a twenty-second driving sub-signal at the third homogenization sub-stage; and the third driving signal further includes a twenty-fourth driving sub-signal at the third homogenization sub-stage; and the twentieth driving sub-signal, the twenty-second driving sub-signal, and the twenty-fourth driving sub-signal each include a second voltage.

The microstructure includes a microcup structure and a microcapsule structure.

In a second aspect, the present disclosure provides an electronic paper display apparatus, including: a controller, a base substrate, a plurality of pixel driving circuits on the base substrate, and an electronic paper film, where the electronic paper film includes a plurality of microstructures; each of the plurality of microstructures includes black particles, white particles, and color particles; where charges of the black particles have a polarity opposite to a polarity of charges of the white particles and the same as a polarity of charges of the color particles, and a charge-to-mass ratio of the black particles is greater than a charge-to-mass ratio of the color particles; the controller is configured to generate a control signal and a driving signal, according to an image displayed by the color electronic paper at a display stage; the control signal is configured to control a pixel driving circuit to be turned on, the driving signal is configured to drive the black particles, the white particles and the color particles in the microstructure; and the pixel driving circuit includes a common electrode and a pixel electrode among the plurality of microstructures, and is configured to be written the driving signal into the pixel electrode under the control of the control signal; and the driving signals include at least a first driving signal, a second driving signal and a third driving signal.

The pixel driving circuit further includes a first transistor and a second transistor; a first electrode of the first transistor is connected to a data line, a second electrode of the first transistor is connected to a first electrode of the second transistor, a second electrode of the second transistor is connected to the pixel electrode, and control electrodes of the first transistor and the second transistor are connected to a gate line.

An orthographic projection of the pixel electrode on the base substrate completely covers an orthographic projection of the first transistor and the second transistor on the base substrate.

An orthographic projection of the pixel electrode on the base substrate is at least partially non-overlapping with an orthographic projection of the first transistor and the second transistor on the base substrate.

In a third aspect, the present disclosure further provides a non-transitory computer-readable medium storing a computer program which, when being executed by a processor, implements any one method described above.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Figure 1:
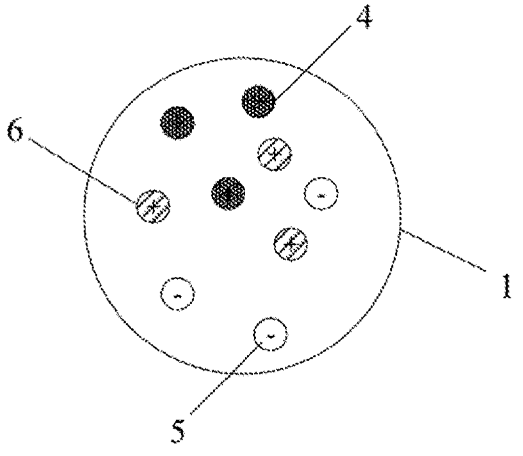
FIG. 1 is a schematic diagram of a microstructure in the prior art.

As shown in FIG. 1, an exemplary color electronic paper includes a plurality of microstructures 1, and each of the plurality of microstructures 1 includes charged particles of three color. The charged particles of the three colors are white particles, black particles, and color particles, respectively. The color particles include, but are not limited to, red particles, and the color particles are exemplified as the red particles 6 in embodiments according to the present disclosure. The black particles 4 have charges opposite to those of the white particles 5 and the red particles 6, and the charge-to-mass ratio of the black particles 4 is greater than that of the red particles 6.

It will be understood by one of ordinary skill in the art that, since the black particles 4 and the red particles 6 have the same charge and the charge-to-mass ratio of the black particles 4 is greater than that of the red particles 6, when a voltage is applied to the pixel electrode 11 and the common electrode 27 to generate an electric field, a moving speed of the black particles 4 is greater than that of the red particles 6.

In addition, the common electrodes 27 corresponding to the respective microstructures 1 may be electrically connected together, and in this case, the voltage signal applied to each common electrode 27 is the same, and the common electrode 27 may be referred to as Vcom electrode. Alternatively, the common electrodes 27 corresponding to the respective microstructures 1 may not be electrically connected, and in this case, the voltage signals applied to the common electrodes 27 may be the same or different. In some embodiments, the common electrodes 27 may be grounded (i.e., 0V voltage).

The polarities of the charges of the black particles 4, the white particles 5, and the red particles 6 are not limited. The black particles 4 and the red particles 6 may be positively charged, and the white particles 5 may be negatively charged. Alternatively, the black particles 4 and the red particles 6 may be negatively charged, and the white particles 5 may be positively charged. In an embodiment according to the present disclosure, as an example for description, the black particles 4 and the red particles 6 are positively charged, and the white particles 5 are negatively charged.

It should be noted that, in an embodiment according to the present disclosure, when the voltage between the pixel electrode 11 and the common electrode 27 is a first voltage, an electric field between the pixel electrode 11 and the common electrode 27 drives the black particles 4 to be closer to a display side than the white particles 5 and the red particles 6, a color displayed on the display side is black, and the voltage value of the first voltage is +15V; when the voltage between the pixel electrode 11 and the common electrode 27 is a second voltage, the electric field between the pixel electrode 11 and the common electrode 27 drives the white particles 5 be closer to the display side than the black particles 4 and the red particles 6, the color displayed on the display side is white, and the voltage value of the second voltage is −15V; when the voltage between the pixel electrode 11 and the common electrode 27 is a third voltage, the electric field between the pixel electrode 11 and the common electrode 27 drives the red particles 6 to be closer to the display side than the white particles 5 and the black particles 4, the color displayed on the display side is red, and the voltage value of the third voltage is +6.4V. The sign of the first voltage, the second voltage, and the third voltage represents a direction of the electric field formed between the pixel electrode 11 and the common electrode 27. In an embodiment according to the present disclosure, a direction from the base substrate to the display side is taken as a positive direction, and vice versa.

In the prior art, because of some problems of the black particles 4, the white particles 5 and the red particles 6 in the microstructure 1 in the driving process, an image sticking exists in the electronic paper during imaging. Particularly when the electronic paper displays a black image, a phenomenon that the red particles 6 remain among the black particles 4 is serious, and the quality of the electronic paper display apparatus is not good enough.

In this regard, the following technical solutions are provided in the embodiments according to the present disclosure.

In a first aspect, the present disclosure provides a driving method of an electronic paper display apparatus, where the electronic paper display apparatus includes a controller 3, a base substrate, and a plurality of pixel driving circuits 2 arranged on the base substrate, and an electronic paper film, the electronic paper film includes a plurality of microstructures 1, and the plurality of pixel driving circuits 2 include a common electrode 27 and a plurality of pixel electrodes 11 among the plurality of microstructures 1.

Figure 2:
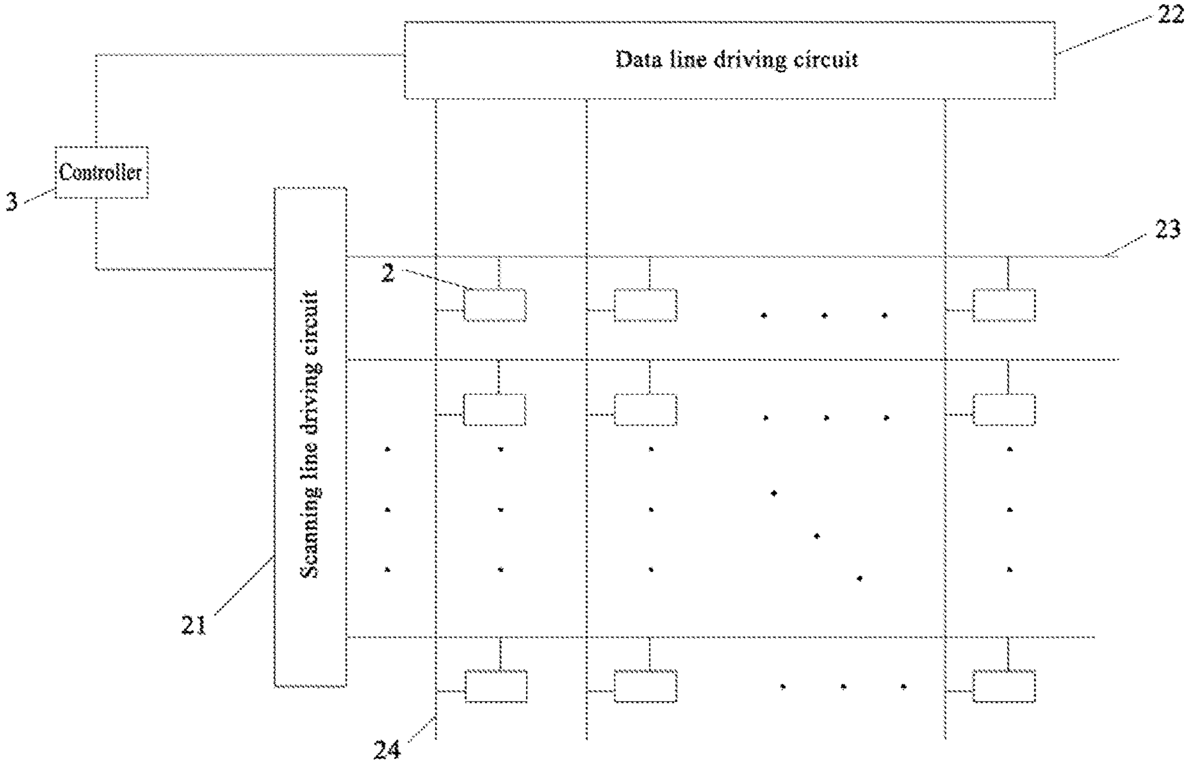
FIG. 2 is a schematic diagram of an electronic paper display apparatus according to the present disclosure.

Specifically, an electronic paper display apparatus shown in FIG. 2 includes a controller 3, a scanning line driving circuit 21, a data line driving circuit 22, and a pixel driving circuit 2. The controller 3 generates a signal indicating an image (image data) displayed on the display part 12, reset data for resetting during image update, and various other signals (clock signals and the like), and outputs the generated signals to the scanning line driving circuit 21 or the data line driving circuit 22. The scanning line driving circuit 21 is connected to respective scanning lines 23, selects any one of the scanning lines, and supplies a predetermined scanning line signal to the selected scanning line. The scanning line signals each has an active level (i.e., a high level) that is sequentially shifted, and are output to the respective scanning lines, whereby the pixel circuits connected to the respective scanning lines are sequentially turned on. The data line driving circuit 14 is connected to respective data lines 24, and supplies data signals to the respective pixel circuits selected by the scanning line driving circuit 13.

Figure 3:
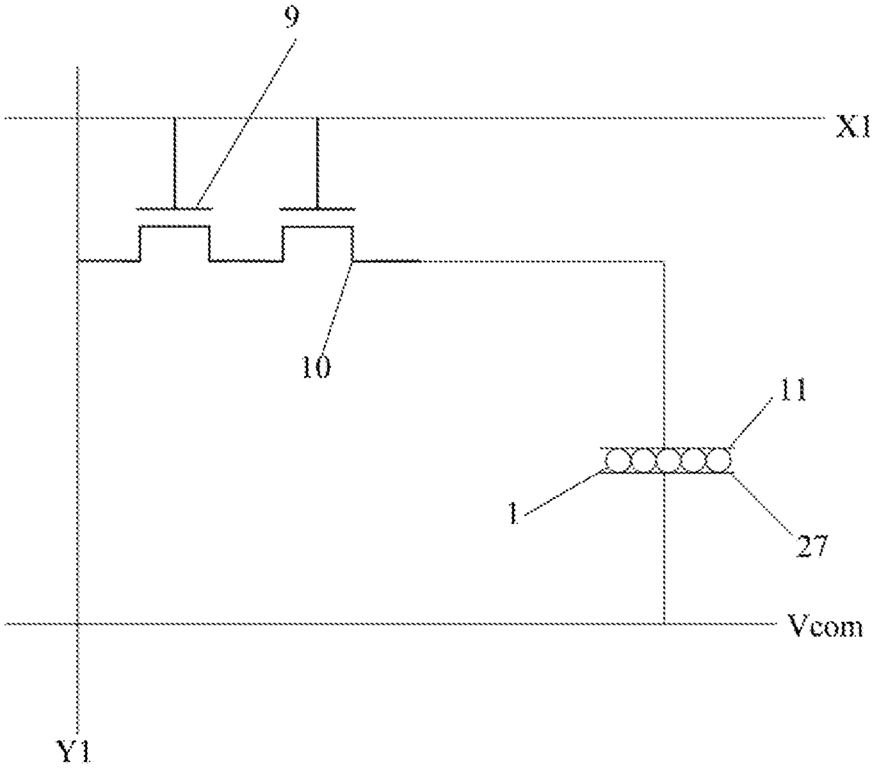
FIG. 3 is a schematic diagram of a pixel driving circuit according to the present disclosure.
Figure 4:
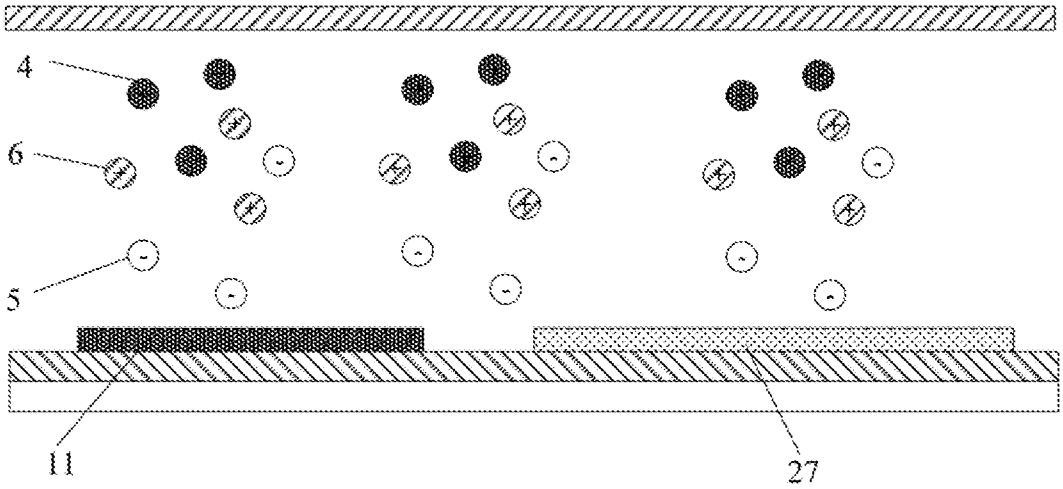
FIG. 4 is a cross-sectional view of an electronic paper film according to the present disclosure.
Figure 5:
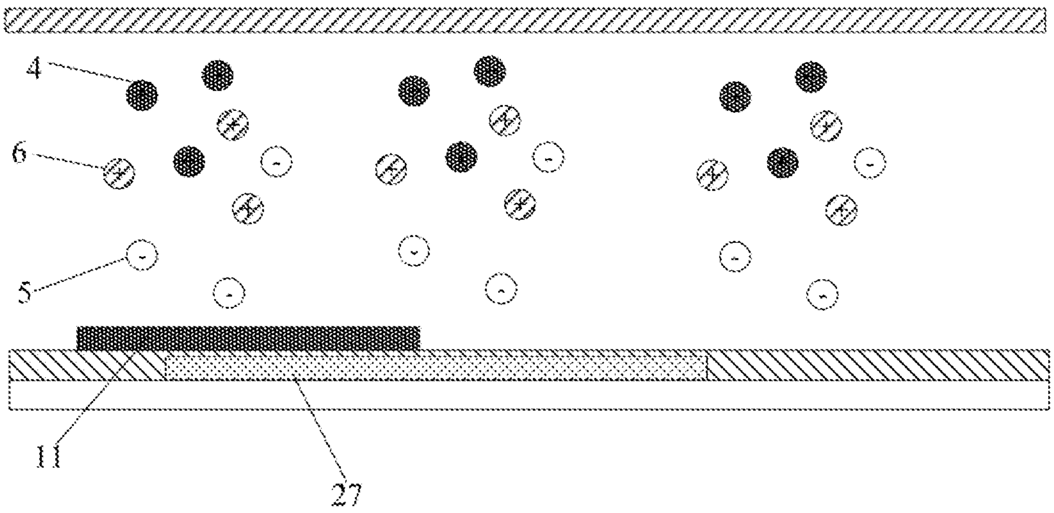
FIG. 5 is a cross-sectional view of another electronic paper film according to the present disclosure.

As shown in FIG. 2, a pixel driving circuit 2 and a plurality of microstructures 1 are arranged at an intersection between the scan line 23 and the data line 24. The pixel driving circuit is shown in FIG. 3, and includes a first transistor 9, a second transistor 10, a common electrode 27, a pixel electrode 11, and a microstructure 1, where the microstructure 1 may be the microstructure 1 shown in FIG. 1. As shown in FIG. 3, the first transistor 9 and the second transistor 10 are used to drive the microstructure 1 connected to the pixel driving circuit 2 according to a driving signal and a data signal. A plurality of common electrodes 27 or only one common electrode 27 may be provided in the embodiment according to the present disclosure. In an embodiment according to the present disclosure, the pixel electrode 11 and the common electrode 27 may be arranged opposite to each other. Alternatively, both of the pixel electrode 11 and the common electrode 27 may be arranged on the base substrate as shown in FIG. 4. Alternatively, the pixel electrode 11 and the common electrode 27 may be stacked on the base substrate as shown in FIG. 5. All of the above-described three cases are within the protection scope of the embodiments according to the present disclosure. In an embodiment according to the present disclosure, a driving signal is input to the pixel electrode 11 corresponding to the pixel displaying a specific color, according to an image to be displayed, so that the charged particles in the microstructure 1 move under the action of an electric field between the pixel electrode 11 and the common electrode 27, and the pixel corresponding to the pixel electrode 11 displays the corresponding color.

Figure 6:
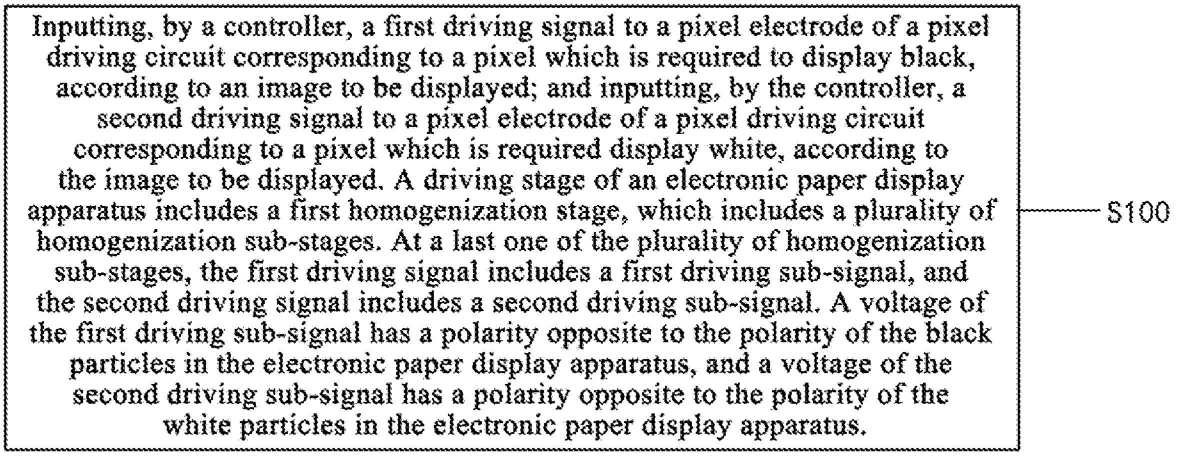
FIG. 6 is a schematic diagram of a driving method of an electronic paper display apparatus according to the present disclosure.

With respect to the electronic paper display apparatus shown in FIGS. 1-5, FIG. 6 is a schematic diagram of a driving method according to an embodiment of the present disclosure. As shown in FIG. 6, an embodiment according to the present disclosure provides a driving method of an electronic paper display apparatus, where the method includes the following step S100.

Figure 7:
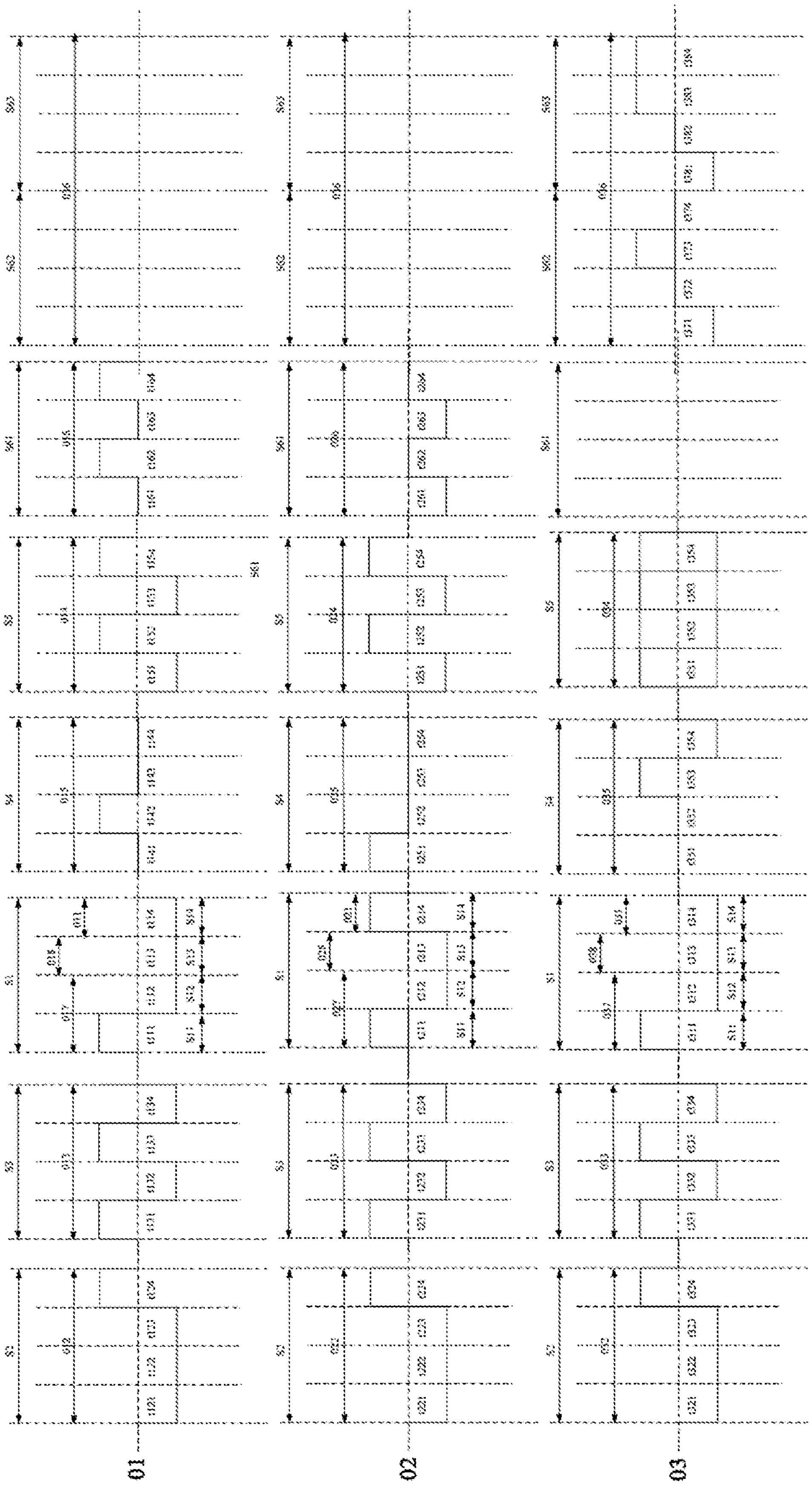
FIG. 7 is a schematic diagram of a first driving signal, a second driving signal, and a third driving signal of an electronic paper display apparatus according to the present disclosure.

S100, according to an image to be displayed, inputting a first driving signal 01 to the pixel electrode 11 of the pixel driving circuit 2 corresponding to a pixel, which is required to display black; and inputting a second driving signal 02 to the pixel electrode 11 of the pixel driving circuit 2 corresponding to a pixel, which is required display white. The waveforms of the first driving signal 01 and the second driving signal 02 are shown in FIG. 7. The driving stage of the electronic paper display apparatus includes a first homogenization stage S1, and the first homogenization stage S1 includes a first homogenization sub-stage S11, a second homogenization sub-stage S12, a third homogenization sub-stage S13, and a fourth homogenization sub-stage S14. At the fourth homogenization sub-stage S14, the first driving signal 01 includes a first driving sub-signal 011, and the first driving sub-signal 011 has a polarity opposite to that of the black particles 4. At the fourth homogenization sub-stage S14, the second driving signal 02 includes a second driving sub-signal 021, and the second driving sub-signal 021 has a polarity opposite to that of the white particles 5. In some embodiments, the microstructures 1 include a microcup structure and a microcapsule structure, and the embodiments according to the present disclosure are illustrated by the microcapsule structure shown in FIG. 1.

In an embodiment according to the present disclosure, the common electrodes 27 in the respective microstructures 1 are electrically connected together. In this case, the voltage signal applied to each common electrode 27 is the same, the common electrode 27 is called a Vcom electrode, and the first driving signal 01 or the second driving signal 02 is inputted to the pixel electrode 11 in the respective pixel driving circuit. In the first homogenization step S1, the voltage of the Vcom electrode is 0V, and therefore, the voltage between the pixel electrode 11 and the common electrode 27 corresponding to the respective microstructure 1 is the first driving signal 01 or the second driving signal 02 input to the pixel electrode 11. Thus, at the first homogenization stage S1, the movements of the black particles 4, the white particles 5 and the red particles 6 in the microstructure 1 may be controlled according to the driving signal to the pixel electrode 11.

Figure 8:
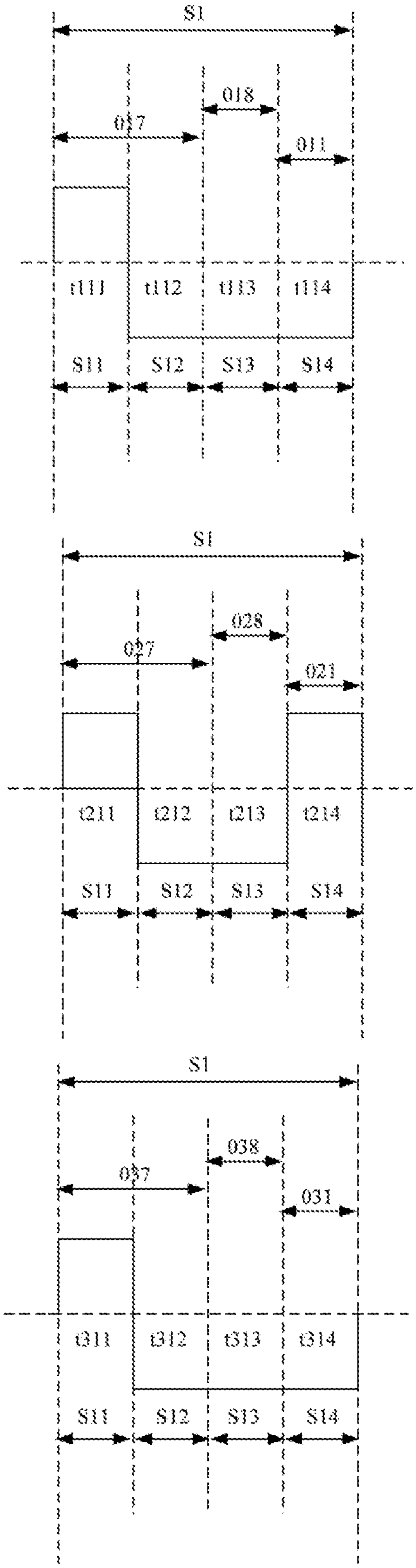
FIG. 8 is a schematic diagram of driving signals of an electronic paper display apparatus at a first homogenization stage according to the present disclosure.

As shown in FIG. 8, the first homogenization stage S1 is composed of a first homogenization sub-stage S11, a second homogenization sub-stage S12, a third homogenization sub-stage S13, and a fourth homogenization sub-stage S14, which drive consecutively in time, and the starting moments of driving of the first homogenization sub-stage S11, the second homogenization sub-stage S12, the third homogenization sub-stage S13 and the fourth homogenization sub-stage S14 sequentially increase. The driving sub-signals of the first driving signal 01 or the second driving signal 02 may have different driving voltages and driving durations in different homogenization sub-stages at the first homogenization sub-stage S11.

In an embodiment according to the present disclosure, the first driving sub-signal 011 of the first driving signal 01 is input to the pixel electrode 11 corresponding to the pixel displaying black at the fourth homogenization sub-stage S14, and since the Vcom voltage of the common electrode 27 is 0V, the electric field in the microstructure 1 corresponding to the pixel displaying black depends on the voltage of the first driving sub-signal 011. Since the polarity of the black particles 4 is positive, and the first driving sub-signal 011 has the polarity opposite to that of the black particles 4, the first driving sub-signal 011 is a driving signal with a negative voltage. Specifically, as shown in FIG. 8, the first driving sub-signal 011 is a square wave signal with a voltage of −15V and a duration of t114. In this way, since the first driving sub-signal 011 is a square wave signal with a voltage of −15V and a duration of t114 at the fourth homogenization sub-stage S14 (the last stage of the first homogenization stage S1), all of the black particles 4 and the red particles 6 which are positively charged in the microstructure 1 corresponding to the pixel displaying black move in a direction away from the light-emitting side, at the end of the first homogenization stage S1. Therefore, the microstructure 1 displaying black can be prevented from being mixed with red particles 6 during imaging, and the phenomenon of red image sticking in the displayed black image can be prevented from occurring.

In an embodiment according to the present disclosure, as shown in FIG. 8, the second driving sub-signal 021 of the second driving signal 02 is input to the pixel electrode 11 corresponding to the pixel displaying white at the fourth homogenization sub-stage S14, and since the Vcom voltage of the common electrode 27 is 0V, the electric field in the microstructure 1 displaying white is the voltage of the second driving sub-signal 021. Since the polarity of the white particles 5 is negative in the present disclosure, and the second driving sub-signal 021 has the polarity opposite to that of the white particles 5, the second driving sub-signal 021 is a driving signal with a positive voltage. Specifically, as shown in FIG. 8, the second driving sub-signal 021 is a square wave signal with a voltage of +15V and a duration of t214. In this way, since the second driving sub-signal 021 is a square wave signal with a voltage of +15V and a duration of t214 at the fourth homogenization sub-stage S14 (the last stage of the first homogenization stage S1), all of the white particles 5 which are negatively charged in the microstructure 1 corresponding to the pixel displaying white are in the direction away from the light-emitting side, at the end of the first homogenization stage S1. Therefore, the microstructure 1 displaying white can be prevented from being mixed with red particles 6 during imaging, and the phenomenon of red image sticking in the displayed black image can be prevented from occurring.

In some embodiments, the driving method of the electronic paper display apparatus according to the present disclosure further includes: inputting a third driving signal 03 to the pixel electrode 11 in the pixel driving circuit 2 corresponding to the pixel displaying a color, according to the image to be displayed. The driving stage of the electronic paper display apparatus includes a first homogenization stage S1, and the first homogenization stage S1 includes a first homogenization sub-stage S11, a second homogenization sub-stage S12, a third homogenization sub-stage S13, and a fourth homogenization sub-stage S14. The waveform of the third driving signal 03 is shown in FIG. 7. At the fourth homogenization sub-stage S14, the third driving signal 03 includes a third driving sub-signal 031. The third driving sub-signal 031 has a polarity opposite to that of the color particles.

In an embodiment according to the present disclosure, the common electrodes 27 in the respective microstructures 1 are electrically connected together. In this case, the voltage signal applied to each common electrode 27 is the same, the common electrode 27 is a common electrode (also referred to as Vcom electrode), and the third driving signal 03 is input to the pixel electrode 11 corresponding to the pixel displaying red. The first homogenization stage S1 and the homogenization sub-stages of the first homogenization stage S1 in this embodiment are the same as those in the previous embodiments, and therefore, the description thereof is omitted here. Similarly, the voltage of the Vcom electrode is 0V, and therefore, the voltage between the pixel electrode 11 and the common electrode 27 corresponding to the respective microstructure 1 displaying red is the third driving signal 03 to the pixel electrode 11. Thus, at the first homogenization stage S1, the movements of the black particles 4, the white particles 5 and the red particles 6 in the microstructure 1 may be controlled according to the third driving signal 03 to the pixel electrode 11.

In an embodiment according to the present disclosure, as shown in FIG. 8, the third driving sub-signal 031 of the third driving signal 03 is input to the pixel electrode 11 corresponding to the pixel displaying red at the fourth homogenization sub-stage S14, and since the Vcom voltage of the common electrode 27 is 0V, the electric field in the microstructure 1 corresponding to the pixel displaying red is the voltage of the third driving sub-signal 031. Since the polarity of the red particles 6 is positive, and the third driving sub-signal 031 has the polarity opposite to that of the red particles 6, the first driving sub-signal 011 is a driving signal with a negative voltage. Specifically, as shown in FIG. 8, the third driving sub-signal 031 is a square wave signal with a voltage of +15V and a duration of t314. In this way, since the third driving sub-signal 031 is a square wave signal with a voltage of +15V and a duration of t314 at the fourth homogenization sub-stage S14 (the last stage of the first homogenization stage S1), all of the black particles 4 and the red particles 6 which are positively charged in the microstructure 1 corresponding to the pixel displaying red move in a direction away from the light-emitting side, at the end of the first homogenization stage S1. Therefore, the microstructure 1 displaying red can be prevented from being mixed with black particles 4 during imaging, and the phenomenon of black image sticking in the displayed red image can be prevented from occurring.

It should be noted that, since the first driving sub-signal 011, the second driving sub-signal 021 and the third driving sub-signal 031 are all at the fourth homogenization sub-stage S14, the duration T114 of the first driving sub-signal 011, the duration T214 of the second driving sub-signal 021 and the duration T314 of the third driving sub-signal 031 are the same and are $\Delta T \times N$, where $\Delta T$ is determined by the period of the driving signal, and N is a constant set manually as required. In an embodiment according to the present disclosure, the period of each driving signal is 50 Hz, and thus $\Delta T=0.02$ s, and N is set to 5 as required. Therefore, the duration of each of the first driving sub-signal 011, the second driving sub-signal 021 and the third driving sub-signal 031 in the embodiment according to the present disclosure is $5\times0.02$ s, i.e. 0.10 s.

With continued reference to FIG. 8, in some embodiments, the first homogenization stage S1 includes a first homogenization sub-stage S11, a second homogenization sub-stage S12, a third homogenization sub-stage S13, and a fourth homogenization sub-stage S14. The first driving signal 01 further includes a nineteenth driving sub-signal 017 at the first homogenization sub-stage S11 and the second homogenization sub-stage S12, and a twentieth driving sub-signal 018 at the third homogenization sub-stage S13. The second driving signal 02 further includes a twenty-first driving sub-signal 027 at the first homogenization sub-stage S11 and the second homogenization sub-stage S12, and a twenty-second driving sub-signal 028 at the third homogenization sub-stage S13. The third driving signal 03 further includes a twenty-third driving sub-signal 037 at the first homogenization sub-stage S11 and the second homogenization sub-stage S12, and a twenty-fourth driving sub-signal 038 at the third homogenization sub-stage S13. The nineteenth driving sub-signal 017, the twenty-first driving sub-signal 027 and the twenty-third driving sub-signal 037 each include pulse signals in which positive and negative voltages are sequentially altered, where the duration of the positive voltage is less than the duration of the negative voltage of the pulse signals of the nineteenth driving sub-signal 017, the twenty-first driving sub-signal 027 and the twenty-third driving sub-signal 037. The nineteenth driving sub-signal 017, the twenty-first driving sub-signal 027 and the twenty-third driving sub-signal 037 each include pulse signals in which positive and negative voltages are sequentially altered.

In an embodiment according to the present disclosure, the Vcom voltage of each common electrode 27 is also 0V, therefore the driving voltage of the pixel electrode 11 corresponding to each microstructure 1 is the voltage in the microcapsule. Since the first homogenization stage S1 is composed of a first homogenization sub-stage S11, a second homogenization sub-stage S12, a third homogenization sub-stage S13 and a fourth homogenization sub-stage S14 which drive consecutively in time, and the starting moments of driving of the first homogenization sub-stage S11, the second homogenization sub-stage S12, the third homogenization sub-stage S13 and the fourth homogenization sub-stage S14 sequentially increase, in the embodiment of the present disclosure, similarly the twentieth driving sub-signal 018 is immediately after the nineteenth driving sub-signal 017, and the twenty-second driving sub-signal 028 is immediately after the twenty-first driving sub-signal 027, and the twenty-fourth driving sub-signal 038 is immediately after the twenty-third driving sub-signal 037.

As shown in FIG. 8, the pulse signals of the nineteenth driving sub-signal 017 of the first driving signal 01, which have the positive and negative voltages altered at the first homogenization sub-stage S11 and the second homogenization sub-stage S12, are input to the pixel electrode 11 corresponding to the pixel displaying black. Since the voltage of the common electrode 27 is 0V, the electric field in the microstructure 1 corresponding to the pixel displaying black is the voltage of the nineteenth driving sub-signal 017. Specifically, the voltage of the nineteenth driving sub-signal 017 at the first homogenization sub-stage S11 is a first voltage, that is, a voltage of +15V, and the nineteenth driving sub-signal 017 at the first homogenization sub-stage S11 is a square wave signal with a duration of t111; the voltage of the nineteenth driving sub-signal 017 at the second homogenization sub-stage S12 is a second voltage, that is, a voltage of −15V, and the nineteenth driving sub-signal 017 at the second homogenization sub-stage S12 is a square wave signal with a duration of t112. Thus, driven by the nineteenth driving sub-signal 017, the black particles 4 are closer to the display side than the white particles 5 and the color particles at the first homogenization sub-stage S11; and the white particles 5 are closer to the display side than the black particles 4 and the color particles at the second homogenization sub-stage S12. In this way, the white particles 5, the red particles 6 and the black particles 4 in the microstructure 1 displaying black shake sufficiently at the first homogenization sub-stage S11 and the second homogenization sub-stage S12 to separate the particles with different colors, so as to reduce the mutual interference between the particles before imaging, so that the microstructure 1 displaying black is prevented from being mixed with particles of other colors during imaging, and the phenomenon of image sticking in the displayed black image is prevented from occurring.

Similarly, the pulse signals of the twenty-first driving sub-signal 027 of the second driving signal 02, which have the positive and negative voltages altered at the first homogenization sub-stage S11 and the second homogenization sub-stage S12, are input to the pixel electrode 11 corresponding to the pixel displaying white. Since the voltage of the common electrode 27 is 0V, the electric field in the microstructure 1 corresponding to the pixel displaying white is the voltage of the nineteenth driving sub-signal 017. Specifically, the voltage of the twenty-first driving sub-signal 027 at the first homogenization sub-stage S11 is a first voltage, that is, a voltage of +15V, and the twenty-first driving sub-signal 027 at the first homogenization sub-stage S11 is a square wave signal with a duration of t211; the voltage of the twenty-first driving sub-signal 027 at the second homogenization sub-stage S12 is a second voltage, that is, a voltage of −15V, and the twenty-first driving sub-signal 027 at the second homogenization sub-stage S12 is a square wave signal with a duration of t212. Thus, driven by the twenty-first driving sub-signal 027, the black particles 4 are closer to the display side than the white particles 5 and the color particles at the first homogenization sub-stage S11; and the white particles 5 are closer to the display side than the black particles 4 and the color particles at the second homogenization sub-stage S12. In this way, the white particles 5, the red particles 6 and the black particles 4 in the microstructure 1 displaying white shake sufficiently at the first homogenization sub-stage S11 and the second homogenization sub-stage S12 to separate the particles with different colors, so as to reduce the mutual interference between the particles before imaging, so that the microstructure 1 corresponding to the pixel displaying white is prevented from being mixed with particles of other colors during imaging, and the phenomenon of image sticking in the displayed white image is prevented from occurring.

Similarly, the pulse signal of the twenty-third driving sub-signal 037 in the same third driving signal 03, which have the positive and negative voltages altered at the first homogenization sub-stage S11 and the second homogenization sub-stage S12, is input to the pixel electrode 11 corresponding to the pixel displaying red. Since the voltage of the common electrode 27 is 0V, the electric field in the microstructure 1 displaying red is the voltage of the nineteenth driving sub-signal 017. Specifically, the voltage of the twenty-first driving sub-signal 027 at the first homogenization sub-stage S11 is a first voltage, that is, a voltage of +15V, and the twenty-first driving sub-signal 027 at the first homogenization sub-stage S11 is a square wave signal with a duration of t311; the voltage of the twenty-first driving sub-signal 027 at the second homogenization sub-stage S12 is a second voltage, that is, a voltage of −15V, and the twenty-first driving sub-signal 027 at the second homogenization sub-stage S12 is a square wave signal with a duration of t312. Thus, driven by the twenty-third driving sub-signal 037, the black particles 4 are closer to the display side than the white particles 5 and the color particles at the first homogenization sub-stage S11; and the white particles 5 are closer to the display side than the black particles 4 and the color particles at the second homogenization sub-stage S12. In this way, the white particles 5, the red particles 6 and the black particles 4 in the microstructure 1 displaying red shake sufficiently at the first homogenization sub-stage S11 and the second homogenization sub-stage S12 to separate the particles with different colors, so as to reduce the mutual interference between the particles before imaging, so that the microstructure 1 displaying red is prevented from being mixed with particles of other colors during imaging, and the phenomenon of image sticking in the displayed red image is prevented from occurring.

In an embodiment according to the present disclosure, the respective driving signals further include a twentieth driving sub-signal 018, a twenty-second driving sub-signal 028 and a twenty-fourth driving sub-signal 038 at the third homogenization sub-stage S13. As shown in FIG. 8, the voltages of the twentieth driving sub-signal 018, the twenty-second driving sub-signal 028 and the twenty-fourth driving sub-signal 038 at the third homogenization sub-stage S13 are all a second voltage, that is, a voltage of −15V, and the twentieth driving sub-signal 018, the twenty-second driving sub-signal 028 and the twenty-fourth driving sub-signal 038 at the third homogenization sub-stage S13 are square wave signals with durations of t113, t213 and t313, respectively. Thus, driven by the twentieth driving sub-signal 018, the twenty-second driving sub-signal 028, and the twenty-fourth driving sub-signal 038, the white particles 5 in the respective microstructures 1 are closer to the display side than the black particles 4 and the color particles at the third homogenization sub-stage S13. In this way, after the particles shake at the first homogenization sub-stage S11 and the second homogenization sub-stage S12, the image is entirely whitened for the convenience of the subsequent driving process.

It should be noted that, since the positive voltages of the nineteenth driving sub-signal 017, the twenty-first driving sub-signal 027 and the twenty-third driving sub-signal 037 are all at the first homogenization sub-stage S11, the durations t111, t211 and t311 of the negative voltages at the first homogenization sub-stage S11 are the same. Similarly, the durations t112, t212 and t312 of the negative voltages of the nineteenth driving sub-signal 017, the twenty-first driving sub-signal 027 and the twenty-third driving sub-signal 037 at the second homogenization sub-stage S12 are the same, and the durations t113, t213 and t313 of the twentieth driving sub-signal 018, the twenty-second driving sub-signal 028 and the twenty-fourth driving sub-signal 038 at the third homogenization sub-stage S13 are also the same. As in the previous embodiments, the duration of each sub-stage is set according to ΔT×N, where ΔT is determined by the period of the driving signal, and N is a constant set manually as required. In an embodiment according to the present disclosure, N for t111, t211, and t311 at the first homogenization sub-stage S11 is set to 4, so that the duration of the positive voltage of the nineteenth, twenty-first, and twenty-third driving sub-signals 017, 027, and 037 at the first homogenization sub-stage S11 is 4×0.02 s, i.e., 0.08 S; N for t112, t212 and t312 at the second homogenization sub-stage S12 is set to 6, so that the duration of the negative voltage of the nineteenth, twenty-first and thirteenth driving sub-signals 017, 027 and 037 at the first homogenization sub-stage S11 is 6×0.02 s, i.e., 0.12 s; N for t113, t213, t313 at the third homogenization sub-stage S13 is set to 24, so that the duration of the twentieth, twelfth and twenty-fourth driving sub-signals 018, 028 and 038 at the first homogenization sub-stage S11 is 24×0.02 s, i.e., 0.48 s.

It should be noted that, at the first homogenization stage S1, the first homogenization sub-stage S11 and the second homogenization sub-stage S12 may be repeated as a pair of stages, and the third homogenization sub-stage S13 and the fourth homogenization sub-stage S14 may be repeated as a pair of stages. For example, in an embodiment according to the present disclosure, after the second homogenization sub-stage S12 is completed, the first homogenization sub-stage S11 is repeated for a preset number of times, which may be M times. In an embodiment of the present disclosure, M may be set to 48, that is, after forty-eight times of repetition of the first homogenization sub-stage S11 and the second homogenization sub-stage S12, then the third homogenization sub-stage S13 and the fourth homogenization sub-stage S14 are entered. Similarly, the third homogenization sub-stage S13 and the fourth homogenization sub-stage S14 may be repeated, in an embodiment of the present disclosure, only once. The first homogenization stage S1 is completed after each of the homogenization sub-stages of the first homogenization stage S1 is repeated and completed. In this way, the first homogenization step S1 allows the black particles 4, the white particles 5, and the red particles 6 in the microstructure 1 sufficiently shake to separate the particles displaying different colors, thereby reducing the mutual interference before imaging and preventing the occurrence of the phenomenon of image sticking.

Figure 9:
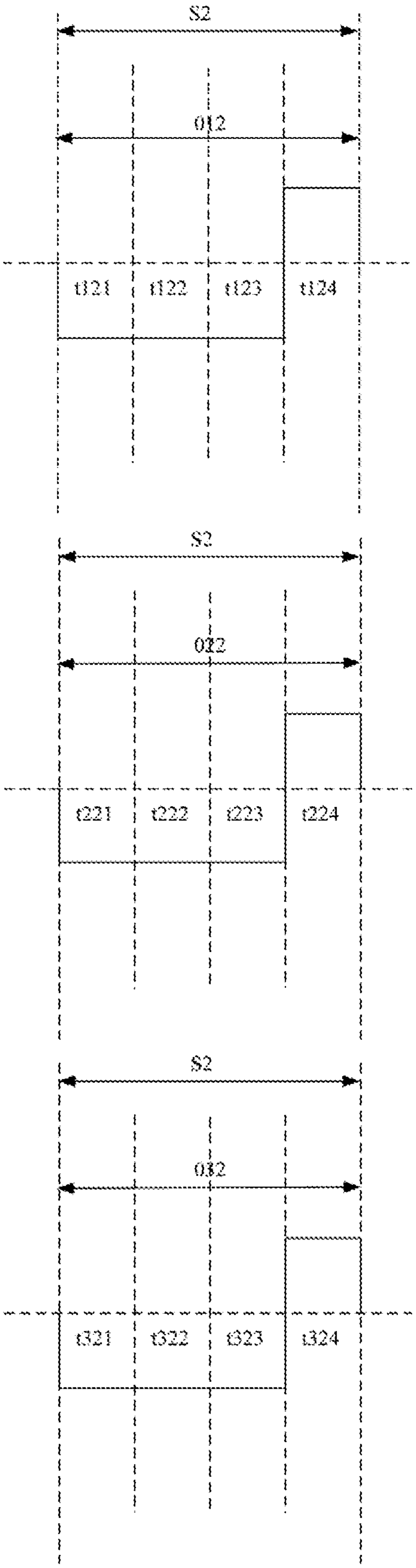
FIG. 9 is a schematic diagram of driving signals of an electronic paper display apparatus at a second homogenization stage according to the present disclosure.

In some embodiments, as shown in FIG. 9, the driving stage of the electronic paper display apparatus further includes a second homogenization stage S2, and the second homogenization stage S2 is before the first homogenization stage. The first driving signal 01 further includes a fourth driving sub-signal 012 at the second homogenization stage S2, the second driving signal 02 further includes a fifth driving sub-signal 022 at the second homogenization stage S2, and the third driving signal 03 further includes a sixth driving sub-signal 032 at the second homogenization stage S2. The fourth driving sub-signal 012, the fifth driving sub-signal 022, and the sixth driving sub-signal 032 each include a first voltage and a second voltage. An effective duration of the second voltage is greater than an effective duration of the first voltage.

In an embodiment according to the present disclosure, the Vcom voltage of the common electrode 27 corresponding to each microstructure 1 is 0V, and the voltage to the pixel electrode 11 corresponding to each microstructure 1 is the voltage of the driving signal thereto. As shown in FIG. 9, the second homogenization stage S2 includes a fifth homogenization sub-stage, a sixth homogenization sub-stage, a seventh homogenization sub-stage and an eighth homogenization sub-stage, which drive consecutively in time, and the starting moments of the fifth homogenization sub-stage, the sixth homogenization sub-stage, the seventh homogenization sub-stage and the eighth homogenization sub-stage sequentially increase. The fourth driving sub-signal 012 of the first driving signal 01, the fifth driving sub-signal 022 of the second driving signal and the sixth driving sub-signal 032 of the third driving signal 03 are input to the pixel electrodes 11 corresponding to the pixels displaying black, white and red, respectively. Since the Vcom voltage of the common electrode 27 is 0V, the electric field in the each microstructure 1 is the voltage of the respective driving sub-signal.

Referring to FIG. 9, the voltages of the fourth driving sub-signal 012, the fifth driving sub-signal 022, and the sixth driving sub-signal 032 at the fifth homogenization sub-stage, the sixth homogenization sub-stage, and the seventh homogenization sub-stage are the second voltage, that is, a square wave signal of −15V. The durations thereof are as follows: the durations of driving of the fourth driving sub-signal 012 at the fifth homogenization sub-stage, the sixth homogenization sub-stage, and the seventh homogenization sub-stage are t121, t122, and t123, respectively; the durations of driving of the fifth driving sub-signal 022 at the fifth homogenization sub-stage, the sixth homogenization sub-stage and the seventh homogenization sub-stage are t221, t222 and t223, respectively; the durations of driving of the sixth driving sub-signal 032 at the fifth homogenization sub-stage, the sixth homogenization sub-stage and the seventh homogenization sub-stage are t321, t322 and t323, respectively. In this way, the voltages of each driving signal at the fifth homogenization sub-stage, the sixth homogenization sub-stage and the seventh homogenization sub-stage are the second voltage, i.e., −15V, so that each driving signal drives the white particles 5 to be closer to the display side than the black particles 4 and the color particles.

With continued reference to FIG. 9, the voltages of the fourth driving sub-signal 012, the fifth driving sub-signal 022, and the sixth driving sub-signal 032 at the eighth homogenization sub-stage are the first voltage, that is, a square wave signal of +15V. The durations thereof are as follows: the duration of driving of the fourth driving sub-signal 012 at the eighth homogenization sub-stage is t124; the duration of driving of the fifth driving sub-signal 022 at the eighth homogenization sub-stage is t224; the duration of driving of the sixth driving sub-signal 032 at the eighth homogenization sub-stage is t324. In this way, the voltage of each driving signal at the eighth homogenization sub-stage is the first voltage, i.e., +15V, so that each driving signal drives the black particles 4 to be closer to the display side than the white particles 5 and the color particles. In this case, the durations of the respective driving signals at the second homogenization stage S2 are controlled, so that at the second homogenization stage S2, by causing the microstructure 1 to display white for a long time and to display black for a short time, the black particles 4, the white particles 5, and the red particles 6 in the microstructure 1 shake, thereby sufficiently separating the particles displaying different colors and reducing the mutual interference between the particles displaying different colors before driving and imaging.

Specifically, the white particles 5 in the microstructure 1 corresponding to the pixel displaying black have time t121, t122, t123 to be closer to the display side than the black particles 4 and the color particles, and the black particles 4 have time t124 to be closer to the display side than the white particles 5 and the color particles. By controlling the sum of t121, t122 and t123 to be greater than t124, it can be realized that the time when the white particles 5 are closer to the display side than the black particles 4 and the color particles is greater than the time when the black particles 4 are closer to the display side than the white particles 5 and the color particles, in the microstructure 1 corresponding to the pixel displaying black. As shown in FIG. 6, the waveforms of the fourth driving sub-signal 012, the fifth driving sub-signal 022, and the sixth driving sub-signal 032 are the same, therefore the manner of implementing that the time when the white particles 5 are closer to the display side than the black particles 4 and the color particles is greater than the time when the black particles 4 are closer to the display side than the white particles 5 and the color particles, in the microstructure 1 corresponding to the pixel displaying white and the microstructure 1 corresponding to the pixel displaying red, is the same as the manner in the microstructure 1 corresponding to the pixel displaying black, and therefore, the description thereof is omitted here.

It should also be noted that, as described in the previous embodiments, the duration of the same sub-stage is substantially the same, and may be calculated according to $\Delta T \times N$, where $\Delta T$ is determined by the period of the driving signal, N is a constant set manually as required, and N for the same sub-stage is the same. The timing of the respective driving signals in the respective sub-stages is thus controlled. Specifically, N for the fourth driving sub-signal 012, the fifth driving sub-signal 022, and the sixth driving sub-signal 032 at the fifth homogenization sub-stage, the sixth homogenization sub-stage, and the seventh homogenization sub-stage is set to 7, and the specific durations t121, t221, and t321 of driving are all 7×0.02 s, that is, 0.14 s. Similarly, N for the fourth driving sub-signal 012, the fifth driving sub-signal 022, and the sixth driving sub-signal 032 at the eighth homogenization sub-stage is set to 3, and the specific durations t124, t224, and t324 of driving are all 3×0.02 s, that is, 0.06 s. It is therefore apparent that in this case, the time when the white particles 5 are closer to the display side than the black particles 4 and the color particles is greater than the time when the black particles 4 are closer to the display side than the white particles 5 and the color particles, in each microstructure 1. By causing the microstructure 1 to display white for a long time and to display black for a short time, the black particles 4, the white particles 5 and the red particles 6 in the microstructure 1 shake, thereby sufficiently separating the particles displaying different colors and reducing the mutual interference between the particles displaying different colors before driving and imaging. Further, after a second homogenization stage S2 has been completed, the second homogenization stage S2 may be repeated. The total number of times of execution of the second homogenization stage S2 may be set to M, which is a natural number, for example, in the embodiment of the present disclosure, M may be set to 7. In this way, the second homogenization stage S2 is performed for multiple times, so that the homogenization effect after the shaking motion of the particles in the microstructure 1 is better, and the image sticking phenomenon is not prone to occur during the microstructure 1 displays an image. In this embodiment, the second homogenization stage S2 is before the first homogenization stage S1. In this way, the particles in the microstructure 1 preliminarily shake at the second homogenization stage S2, so that the particles in the microstructure 1 are homogenized, and then the first homogenization stage S1 is performed, so that the effect of performing the first homogenization stage S1 is better.

Figure 10:
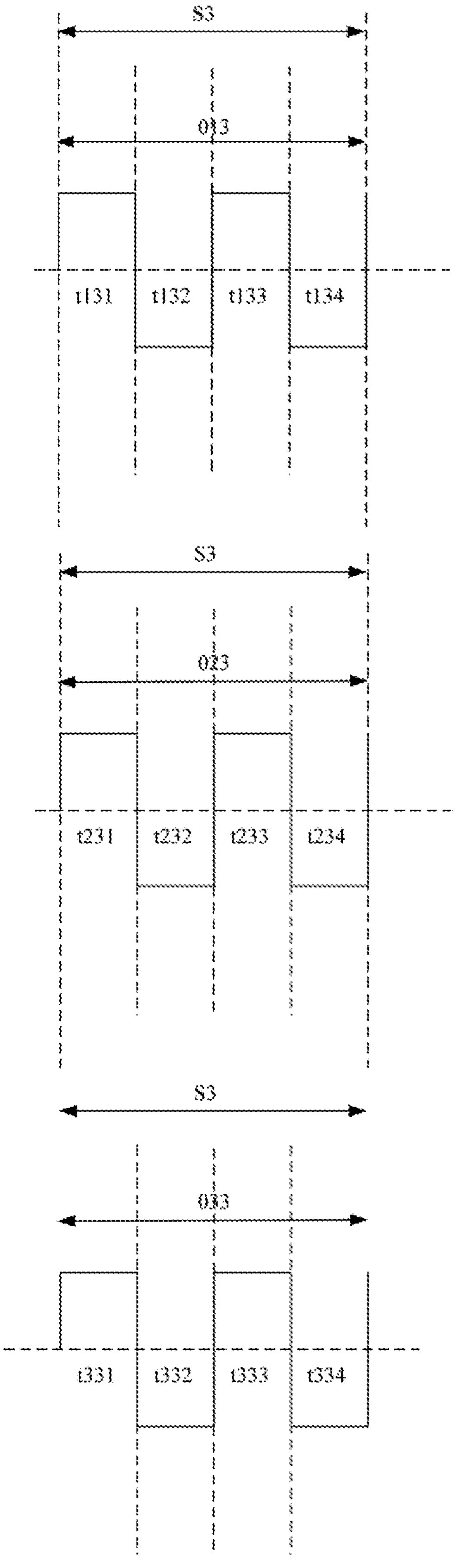
FIG. 10 is a schematic diagram of driving signals of an electronic paper display apparatus at a third homogenization stage according to the present disclosure.

In some embodiments, as shown in FIG. 10, the driving stage of the electronic paper display apparatus further includes a third homogenization stage S3, and the third homogenization stage S3 is between the second homogenization stage S2 and the first homogenization stage S1. The first driving signal 01 further includes a seventh driving sub-signal 013 at the third homogenization stage S3, the second driving signal 02 further includes an eighth driving sub-signal 023 at the third homogenization stage S3, the third driving signal 03 further includes a ninth driving sub-signal 033 at the third homogenization stage S3, and each of the seventh driving sub-signal 013, the eighth driving sub-signal 023 and the ninth driving sub-signal 033 includes pulse signals with positive and negative voltages sequentially alternated.

In an embodiment according to the present disclosure, the Vcom voltage of the common electrode 27 corresponding to each microcapsule is also 0V, therefore the driving voltage of the pixel electrode 11 corresponding to each microcapsule is the field strength of the electric field in the microcapsule. As shown in FIG. 10, at the third homogenization stage S3, the seventh driving sub-signal 013, the eighth driving sub-signal 023, and the ninth driving sub-signal 033 are input to the pixel electrodes 11 corresponding to the pixels for displaying black, white, and red, respectively. Since the seventh driving sub-signal 013, the eighth driving sub-signal 023 and the ninth driving sub-signal 033 each include pulse signals in which positive and negative voltages are sequentially alternated, the positive voltage of the pulse signal is a first voltage, i.e., +15V, and the negative voltage of the pulse signal is a second voltage, i.e., −15V, as shown in FIG. 7, the waveforms of the seventh driving sub-signal 013, the eighth driving sub-signal 023 and the ninth driving sub-signal 033 at this time are the same.

In this way, when the seventh driving sub-signal 013, the eighth driving sub-signal 023 and the ninth driving sub-signal 033 are positive voltages, the black particles 4 are driven to be closer to the display side than the white particles 5 and the color particles, and the screen displays black at this time; when the seventh driving sub-signal 013, the eighth driving sub-signal 023 and the ninth driving sub-signal 033 are negative voltages, the white particles 5 are driven to be closer to the display side than the black particles 4 and the color particles, and the screen displays white. Because of the alternating positive and negative voltages, the respective microstructures 1 are switched between displaying black and displaying white, that is, the black particles 4 and the white particles 5 therein are in sufficient motion during the third homogenization stage S3. Therefore, in this way, the white particles 5, the red particles 6 and the black particles 4 in each microstructure 1 shake sufficiently at the third homogenization stage S3 to separate the particles with different colors, so as to reduce the mutual interference between the particles before imaging, so that the microstructure 1 is prevented from being mixed with particles of other colors during imaging, and the phenomenon of image sticking in the displayed image is prevented from occurring.

In some embodiments, the duration of the negative voltage is greater than the duration of the positive voltage, in the above-described pulse signals. Since the black particles 4 move faster than the white particles 5 in each microstructure 1, the duration of the negative voltage may be set greater than the duration of the positive voltage to balance the time when the black particles 4 are on the display side with respect to the white particles 5 and the red particles 6 and the time when the white particles 5 are on the display side with respect to the black particles 4 and the red particles 6. Therefore, the shaking motions of the black particles 4 and the white particles 5 in the microstructure 1 are more balanced, and the mutual interference between the particles before imaging is reduced, so that the microstructure 1 is prevented from being mixed with particles of other colors during imaging, and the phenomenon of image sticking in the displayed image is prevented from occurring.

It should be noted that, since the seventh driving sub-signal 013, the eighth driving sub-signal 023 and the ninth driving sub-signal 033 are all at the third homogenization stage S3, the third homogenization stage S3 may be divided into four consecutive sub-stages with different starting and ending moments, as described above for the first homogenization stage S1 and the second homogenization stage S2. The positive and negative alternating pulse signals of the seventh driving sub-signal 013, the eighth driving sub-signal 023 and the ninth driving sub-signal 033 may be sequentially alternated in successive sub-stages. For example, the positive voltage is at the first sub-stage, the negative voltage is at the second sub-stage, the positive voltage is at the third sub-stage, and the negative voltage is at the fourth sub-stage. In this way, the driving signal is facilitated to drive.

Similar to the sub-stages of the first homogenization stage S1 and the second homogenization stage S2 described above, the durations of the driving signals at the same sub-stage of the third homogenization stage S3 are the same. Therefore, the durations of the sub-stages of the seventh driving sub-signal 013 are t131, t132, t133 and t134, respectively; the durations of the sub-stages of the eighth driving sub-signal 023 are t231, t232, t233 and t234, respectively; the durations of the sub-stages of the ninth driving sub-signal 033 are t331, t332, t333, and t334, respectively. Among them, t131 and t133 are durations of the positive voltage of the seventh sub-signal, i.e., the durations of +15V voltage, and t132 and t134 are the durations of the negative voltage of the seventh sub-signal, i.e., the durations of −15V voltage; similarly, t231 and t233 are the durations of the positive voltage of the eighth sub-signal, i.e., the durations of +15V voltage, and t232 and t234 are the durations of the negative voltage of the eighth sub-signal, i.e., the durations of −15V voltage; similarly, t331 and t333 are the durations of the positive voltage of the ninth sub-signal, i.e., the durations of +15V voltage, and t332 and t334 are the durations of the negative voltage of the ninth sub-signal, i.e., the durations of −15V voltage. As the same as in the previous embodiments, the duration of each sub-stage is set according to ΔT×N, where ΔT is determined by the period of the driving signal, N is a constant set manually as required, and N for the same sub-stage is the same. In an embodiment of the present disclosure, N for a stage in which the driving signal is a positive voltage may be set to 5, and N for a stage in which the driving signal is a negative voltage may be set to 6. The duration of the sub-stage of positive voltage is thus 5×0.02 s, i.e. 0.1 s, and the duration of the sub-stage of negative voltage is 6×0.02 s, i.e. 0.12*s*.

Meanwhile, the third homogenization stage S3 in the embodiment according to the present disclosure is the same as the second homogenization stage S2, and the third homogenization stage S3 may be repeated after one third homogenization stage S3 is completed. The total number of times of execution of the third homogenization stage S3 may be set to M, which is a natural number, for example, in the embodiment of the present disclosure, M may be set to 32. In this way, the third homogenization stage S3 is performed for multiple times, so that the homogenization effect after the shaking motion of the particles in the microstructure 1 is better, and the image sticking phenomenon is not prone to occur during the electronic paper display apparatus displays an image.

Figure 11:
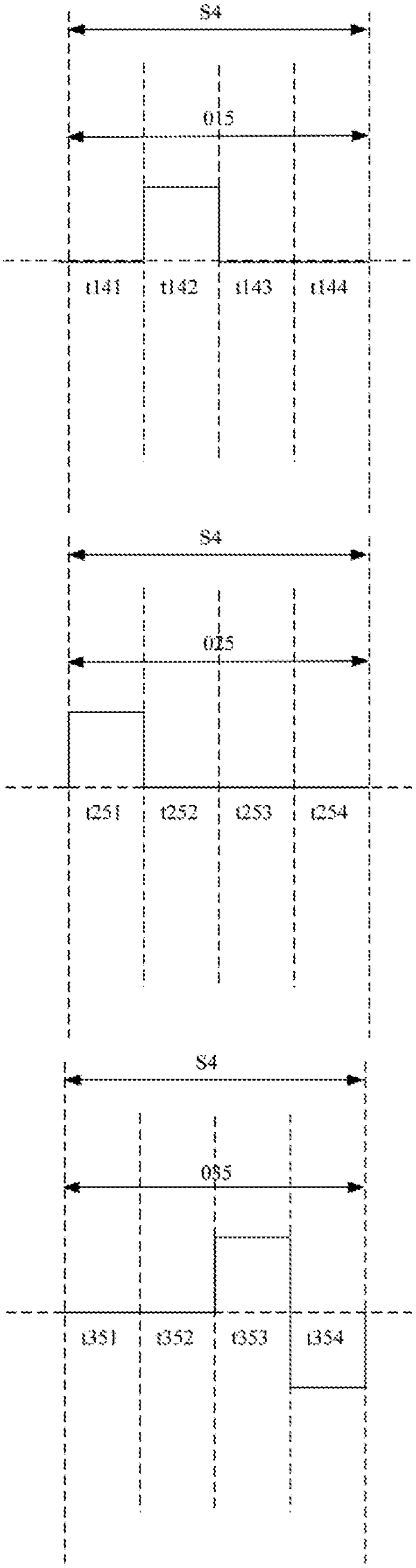
FIG. 11 is a schematic diagram of driving signals of an electronic paper display apparatus at a balance stage according to the present disclosure.

In some embodiments, as shown in FIG. 11, the driving stage of the electronic paper display apparatus further includes a balance stage S4, and the balance stage S4 is after the first homogenization stage S1. The first driving signal 01 further includes a thirteenth driving sub-signal 015 at the balance stage S4, the second driving signal 02 further includes a fourteenth driving sub-signal 025 at the balance stage S4, and the third driving signal 03 further includes a fifteenth driving sub-signal 035 at the balance stage S4. The thirteenth driving sub-signal 015 and the fourteenth driving sub-signal 025 enable to drive the white particles 5 in the microstructure 1 back to the initial positions, and the fifteenth driving sub-signal 035 enables to drive the white particles 5 and the color particles in the microstructure 1 back to the initial positions.

In an embodiment according to the present disclosure, the Vcom voltage of the common electrode 27 corresponding to each microstructure 1 is 0V, therefore the voltage to the pixel electrode 11 corresponding to each microstructure 1 is the voltage of the driving signal thereto, and the field strength of the electric field in each microstructure 1 is the voltage of the driving signal input to the pixel electrode 11 corresponding to the microstructure 1. As shown in FIG. 11, at the balance stage S4, a thirteenth driving sub-signal 015, a fourteenth driving sub-signal 025 and a fifteenth driving sub-signal 035 are input to the pixel electrode 11 corresponding to the pixel displaying black, white and red, respectively. As shown in FIG. 11, the thirteenth driving sub-signal 015 sequentially includes a Vcom voltage, a first voltage, a Vcom voltage, and a Vcom voltage; and the fourteenth driving sub-signal 025 sequentially includes the first voltage, the Vcom voltage, the Vcom voltage, and the Vcom voltage, where the voltages are sequentially at the respective sub-stages of the balance stage S4, and the sub-stages of the balance stage S4 are four consecutive sub-stages with different starting and ending moments as the first equalizing stage S1 and the second equalizing stage S2. Since the balance stage S4 is after the first homogenization stage S1, the first voltage of the thirteenth driving sub-signal 015 and the fourteenth driving sub-signal 025 pushes the negatively charged white particles 5, which are pushed more at the first homogenization stage S1, the second homogenization stage S2 and the third homogenization stage S3, to move away from the light-emitting side, returning to their initial positions. In this way, the white particles 5, the black particles 4 and the red particles 6 in the microstructures 1, which are required display black and white in a displayed image, are prevented from generating a built-in electric field, due to unbalance of the electric field, so that polarization caused thereby is prevented.

Similarly, with continued reference to FIG. 11, the fifteenth driving sub-signal 035 at the balance stage S4 includes a Vcom voltage, a Vcom voltage, a first voltage, and a second voltage, which are sequentially at the respective sub-stages of the balance stage S4. Since the balance stage S4 is after the first homogenization stage S1, the first and second voltages of the fifteenth driving sub-signal 035 push the negatively charged white particles 5 and the positively charged red particles 6, which are pushed more at the first homogenization stage S1, the second homogenization stage S2 and the third homogenization stage S3, to move and return to their initial positions. In this way, the white particles 5, the black particles 4 and the red particles 6 in the microstructures 1, which are required display black and white in a displayed image, are prevented from generating a built-in electric field due to unbalance of the electric field, so that polarization caused thereby is prevented.

It should be noted that, similar to the sub-stages of the first homogenization stage S1 and the second homogenization stage S2, the durations of the driving signals at the same sub-stage of the homogenization stage S4 are the same. Therefore, the durations of the respective sub-stages of the thirteenth driving sub-signal 015 are t141, t142, t143 and t144, respectively; the durations of the sub-stages of the fourteenth driving sub-signal 025 are t241, t242, t243 and t244, respectively; the durations of the sub-stages of the fifteenth driving sub-signal 035 are t341, t342, t343, and t344, respectively. Among them, t142 is the duration of the positive voltage of the thirteenth driving sub-signal 015, i.e., the duration of +15V voltage, and t141, t143, and t144 are the durations of the Vcom voltage of the thirteenth driving sub-signal 015, i.e., the durations of 0V voltage; t241 is the duration of the positive voltage of the fourteenth driving sub-signal 025, i.e., the duration of +15V voltage, and t242, t143, and t144 are the durations of the Vcom voltage of the fourteenth driving sub-signal 025, i.e., the durations of 0V voltage; t343 is the duration of positive voltage of the fifteenth driving sub-signal 035, i.e., the duration of +15V voltage, t344 is the duration of negative voltage of the fifteenth driving sub-signal 035, i.e., the duration of −15V, and t341 and t342 are the durations of Vcom voltage of the fourteenth driving sub-signal 025, i.e., the durations of 0V voltage.

Similar to the previous embodiments, the duration of each sub-stage is set according to ΔT×N, where ΔT is determined by the period of the driving signal, N is a constant set manually as required, and N for the same sub-stage is the same. N is sequentially set to 50, 30, 39 and 8 for the sub-stages, respectively. Therefore, the values of t141, t241 and t341 are 50×0.02 s, i.e. 1.00 s; the values of t142, t242 and t342 are 30×0.02 s, i.e. 0.60 s; the values of t143, t243, and t343 are 39×0.02 s, i.e. 0.78 s; and the values of t144, t244, and t344 are 8×0.02 s, i.e. 0.16 s. Through setting the durations of the respective sub-stages as such, the balance stage S4 has a better balance effect, so as to prevent the phenomenon of polarization of particles in each microstructure 1 from occurring, and prevent the display from being affected.

Meanwhile, the balance stage S4 in the embodiment according to the present disclosure is similar to the first homogenization stage S1, the second homogenization stage S2 and the third homogenization stage S3, and the balance stage S4 may be repeated after one balance stage S4 is completed. The total number of times of execution of the balance stage S4 may be set to M, which is a natural number, for example, in the embodiment of the present disclosure, M may be set to 8. In this way, the balance stage S4 is performed for multiple times, so that the balance effect of the particles in the microstructure 1 is better, and the polarization of the charged particles caused by the built-in electric field is not prone to occur when the microstructure 1 forms an image, and the displaying of the microstructure 1 is not prone to be affected.

Figure 12:
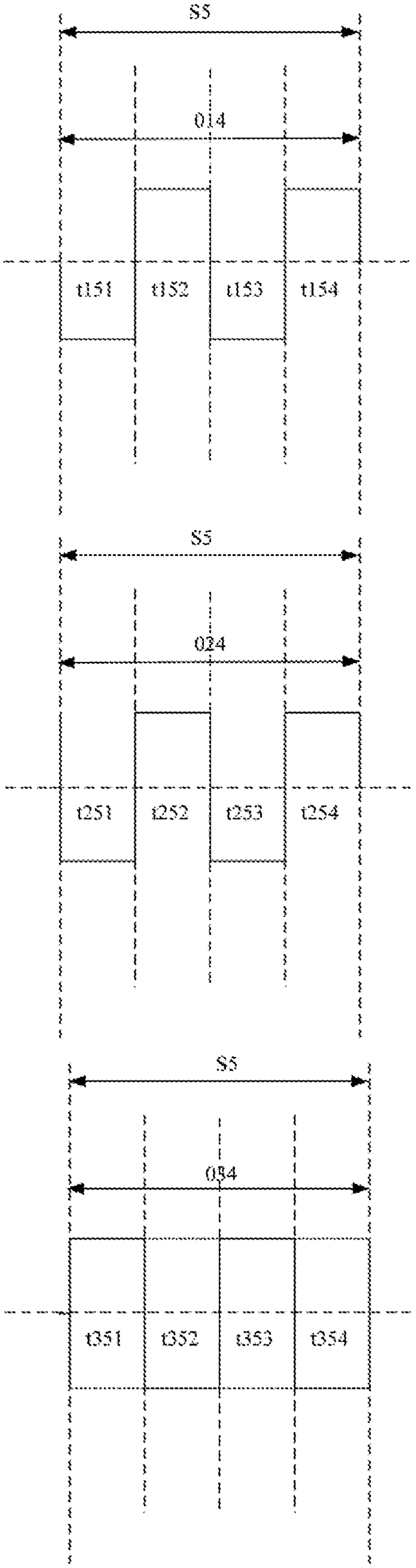
FIG. 12 is a schematic diagram of driving signals of an electronic paper display apparatus at a fourth homogenization stage according to the present disclosure.

In some embodiments, as shown in FIG. 12, the driving stage of the electronic paper display apparatus further includes a fourth homogenization stage S5, and the fourth homogenization stage S5 is before a display stage of the microstructure 1. The first driving signal 01 further includes a tenth driving sub-signal 014 at the fourth homogenization stage S5, the second driving signal 02 further includes an eleventh driving sub-signal 024 at the fourth homogenization stage S5, and the third driving signal 03 further includes a twelfth driving sub-signal 034 at the fourth homogenization stage S5. The tenth driving sub-signal 014 and the eleventh driving sub-signal 024 each include pulse signals with negative and positive voltages sequentially alternated, the twelfth driving sub-signal 034 has the pulse signals inverse to those of the tenth driving sub-signal 014, and the voltage of the common electrode 27 corresponding to the microstructure 1 includes pulse signals with negative and positive voltages sequentially alternated, which have the same magnitude as the voltage of the pixel electrode 11 opposite to the common electrode.

In an embodiment according to the present disclosure, the common electrodes 27 in the respective microstructures 1 are electrically connected together, and in this case, the voltage signal applied to each common electrode 27 is the same. Since the voltage of the common electrode 27 of the microstructure 1 at the fourth homogenization stage S5 includes pulse signals with negative and positive sequentially alternated, the electric field in the microstructure 1 should be the difference between voltages at the pixel electrode 11 and the common electrode 27, that is, the driving signal voltage to the pixel electrode 11 cannot be equal to the voltage of the electric field in the microstructure 1. Since the tenth driving sub-signal 014 and the eleventh driving sub-signal 024 include pulse signals in which positive and negative voltages are sequentially alternated, specifically, as shown in FIG. 12, the tenth driving sub-signal 014 and the eleventh driving sub-signal 024 are sequentially driving signals of a second voltage, a first voltage, a second voltage, and a first voltage. Since the voltages of the common electrode 27 are pulse signals in which negative and positive voltages are sequentially alternated and has the same magnitude as the voltage of the pixel electrode 11 opposite to the common electrode 27, the voltages of the common electrode 27 are also driving signals of the second voltage, the first voltage, second voltage, and the first voltage which are sequentially arranged. Therefore, at the fourth homogenization stage S5, although the first driving signal 01 and the second driving signal 02 are input to the pixel electrode 11, the black particles 4 and the white particles 5 in the microstructures 1 for displaying black and the microstructure 1 for displaying white are substantially unmoved at the fourth homogenization stage S5, due to that the electric signal of the common electrode 27 completely coincides with that of the pixel electrode 11. In this way, at the fourth homogenization stage S5, the microstructures 1 for displaying red are better homogenized.

With continued reference to FIG. 12, since the pulse signal of the twelfth driving sub-signal 034 is inverse to the pulse signal of the tenth driving sub-signal 014, the driving signals of the twelfth driving sub-signal 034 are sequentially the first voltage, the second voltage, the first voltage, and the second voltage. Since the voltages of the common electrode 27 at this stage are also the driving signals of the second voltage, the first voltage, the second voltage, and the first voltage which are sequentially arranged. Since the first voltage is +15V and the second voltage is −15V, at this time, the electric field in the microstructure 1 displaying red has pulse signals with ±30V alternated. In this way, the particles in the microstructure 1 displaying red shake under an large alternating current voltage, so that the white particles 5, the red particles 6 and the black particles 4 in the display sufficiently shake at the fourth homogenization step S5 to separate the particles with different colors, so as to reduce the mutual interference between the particles before imaging, so that the particles with different colors are distributed more uniformly when the color electronic paper forms an image.

It should be noted that, since the tenth driving sub-signal 014 of the first driving signal 01, the eleventh driving sub-signal 024 of the second driving signal 02, and the twelfth driving sub-signal 034 of the third driving signal 03 are all at the fourth homogenization stage S5, the fourth homogenization stage S5 may be divided into four consecutive sub-stages with different starting and ending moments, as at the first homogenization stage S1, the second homogenization stage S2 and the third homogenization stage S3. The alternating first and second voltages of the tenth driving sub-signal 014, the eleventh driving sub-signal 024, and twelfth driving sub-signal 034 may be sequentially alternated in successive sub-stages. For example, the tenth driving sub-signal 014 sequentially includes the second voltage at the first sub-stage of the fourth homogenization stage S5, the first voltage at the second sub-stage of the fourth homogenization stage S5, the second voltage at the third sub-stage of the fourth homogenization stage S5, and the first voltage at the fourth sub-stage of the fourth homogenization stage S5. The eleventh driving sub-signal 024, the twelfth driving sub-signal 034, and relationship between the signals of the second voltage and respective sub-stages are the same as those of the tenth driving sub-signal 014, and therefore, the description thereof is omitted here.

Similar to the sub-stages at the first homogenization stage S1, the second homogenization stage S2, and the third homogenization stage S3 described above, the durations of the driving signals at the same sub-stages of the fourth homogenization stage S5 are the same. Therefore, the durations of the sub-stages of the tenth driving sub-signal 014 are t151, t152, t153 and t154, respectively; the durations of the sub-stages of the eleventh driving sub-signal 024 are t251, t252, t253, and t254; and the durations of the sub-stages of the twelfth driving sub-signal 034 are t351, t352, t353 and t354, respectively. Among them, t151 and t153 are the durations of the second voltage of the tenth sub-signal, i.e., the durations of −15V voltage, and t152 and t154 are the durations of the first voltage of the tenth signal, i.e., the durations of +15V voltage; similarly, t251 and t253 are the durations of the second voltage of the eleventh sub-signal, i.e., the durations of −15V voltage, and t252 and t254 are the durations of the first voltage of the eleventh signal, i.e., the durations of +15V voltage; similarly, t331 and t333 are the durations of the first voltage of the twelfth sub-signal, i.e., the durations of +15V, and t332 and t334 are the durations of the second voltage of the twelfth sub-signal, i.e., the durations of −15V. As the same as in the previous embodiments, the duration of each sub-stage is set according to ΔT×N, where ΔT is determined by the period of the driving signal, N is a constant set manually as required, and N for the same sub-stage is the same. In an embodiment of the present disclosure, N for a stage of each driving voltage may be set to 5. Therefore, the duration of the sub-stage of positive voltage is the 5×0.02 s, i.e. 0.1*s*.

Meanwhile, the fourth homogenization stage S5 in the embodiment according to the present disclosure is the same as the first homogenization stage S1, the second homogenization stage S2, and the third homogenization stage S3, and the fourth homogenization stage S5 may be repeated after one fourth homogenization stage S5 is completed. The total number of times of execution of the fourth homogenization stage S5 may be set to M, which is a natural number, for example, in the embodiment of the present disclosure, M may be set to 3. In this way, the fourth homogenization stage S5 is performed for multiple times, so that the homogenization effect after the shaking motion of the particles in the microstructure 1 is better, and the image sticking phenomenon is not prone to occur during the microstructure 1 forms an image.

Figure 13:
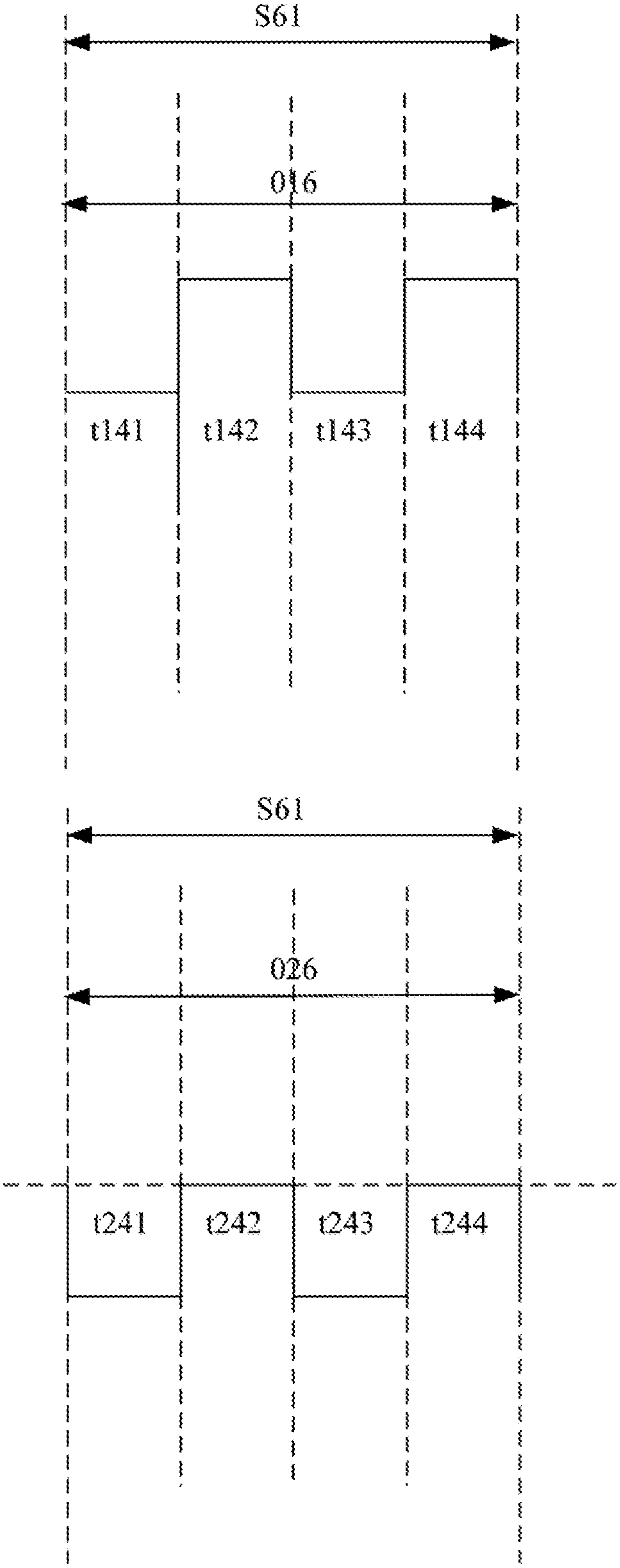
FIG. 13 is a schematic diagram of driving signals of an electronic paper display apparatus at a first display sub-stage and a second display sub-stage according to the present disclosure.
Figure 14:
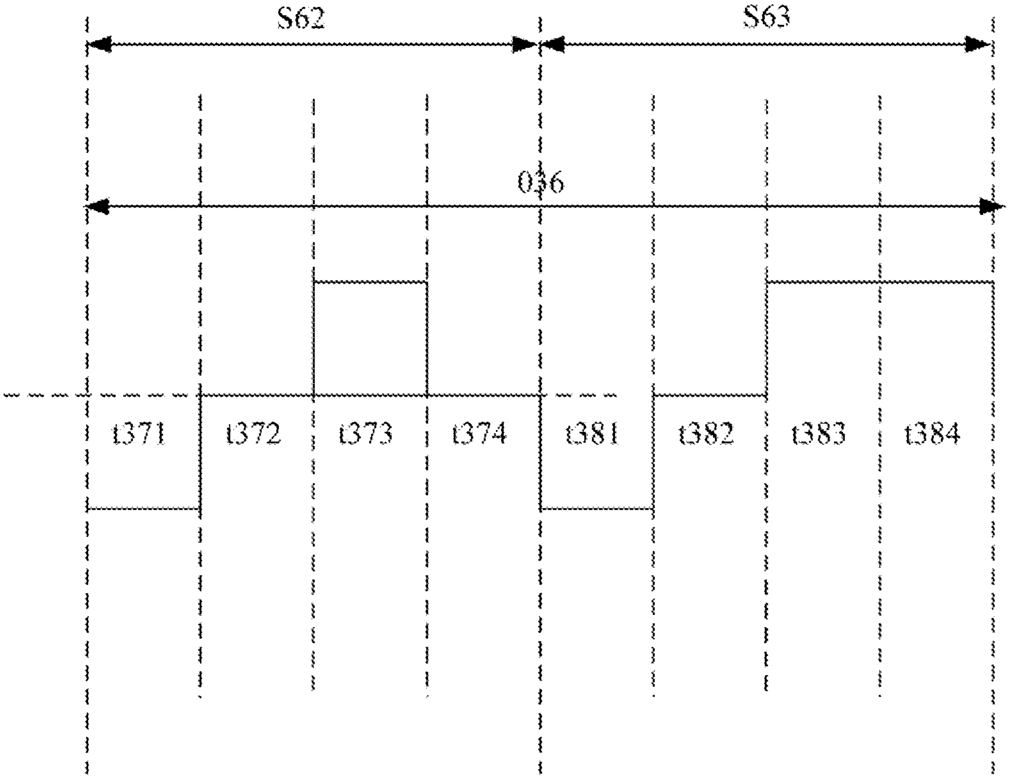
FIG. 14 is a schematic diagram of driving signals of an electronic paper display apparatus at a third display sub-stage according to the present disclosure.

In some embodiments, as shown in FIGS. 13 and 14, the display stage includes a first display sub-stage S61, a second display sub-stage S62, and a third display sub-stage S63. The first driving signal 01 further includes a sixteenth driving sub-signal 016 at the first display sub-stage S61, the second driving signal 02 further includes a seventeenth driving sub-signal 026 at the first display sub-stage S61, and the third driving signal 03 further includes an eighteenth driving sub-signal 036 at the second display sub-stage S62 and the third display sub-stage S63. The sixteenth driving sub-signal includes the first voltage and a zero voltage which are alternately arranged, the seventeenth driving sub-signal includes the zero voltage and the second voltage which are alternately arranged, and the eighteenth driving sub-signal includes the second voltage, the zero voltage and a third voltage. An effective duration of the third voltage is greater than the duration of the second voltage.

In an embodiment according to the present disclosure, the common electrodes 27 corresponding to the respective microstructures 1 are electrically connected together, and in this case, the Vcom voltage applied to each common electrode 27 is the same. At the display stage, the voltage of the Vcom electrode is 0V, therefore the field strength in each microstructure 1 is the driving signal to the pixel electrode 11. Since the sixteenth driving sub-signal 016 of the first driving signal 01 is inputted to the pixel electrode 11 of the microstructure 1 displaying black, the electric field in the microstructure 1 displaying black is the sixteenth driving sub-signal 016. As shown in FIG. 13, the sixteenth driving sub-signal 016 is a Vcom signal, a first voltage, a Vcom signal and a first voltage that are sequentially arranged. Since the black particles 4 are positively charged, the black particles 4 in the microstructure 1 displaying black are closer to the display side than the white particles 5 and the color particles. The sixteenth driving sub-signal 016 may allow the microstructure 1 electrically connected thereto display black, completing the display of black.

Similarly, since the seventeenth driving signal 026 of the second driving signal 02 is input to the pixel electrode 11 of the microstructure 1 displaying white, the electric field in the microstructure 1 displaying white is the seventeenth driving signal 026. As shown in FIG. 13, the seventeenth driving sub-signal 026 is the second voltage, the Vcom signal, the second voltage, and the Vcom, which are sequentially arranged. Since the white particles 5 are negatively charged, the white particles 5 in the microstructure 1 displaying white are closer to the display side than the black particles 4 and the color particles. The seventeenth driving sub-signal 026 may allow the microstructure 1 electrically connected thereto display white, completing the display of white.

Similarly, since the eighteenth driving sub-signal 036 of the third driving signal 03 is input to the pixel electrode 11 of the microstructure 1 displaying red, the electric field in the microstructure 1 displaying red is the eighteenth driving sub-signal 036. As shown in FIG. 14, the eighteenth driving sub-signal 036 is the second voltage, the Vcom signal, the third voltage, the Vcom signal, the second voltage, the Vcom signal, the third voltage, and the third voltage, which are sequentially arranged. Since the red particles 6 are positively charged and have a charge-to-mass ratio different from that of the black particles 4, the red particles 6 in the microstructure 1 displaying red are closer to the display side than the black particles 4 and the white particles 5. The eighteenth driving sub-signal 036 may allow the microstructure 1 electrically connected thereto display red, completing the display of red.

The first display sub-stage S61 may be divided into four consecutive display sub-stages with different starting and ending moments, as described at the first homogenization stage S1, the second homogenization stage S2, the third homogenization stage S3, and the fourth homogenization stage S5. The sixteenth driving sub-signal 016 may be sequentially at successive display sub-stages. For example, the Vcom signal is at the first display sub-stage, the first voltage is at the second display sub-stage, the Vcom signal is at the third display stage, and the first voltage is at the fourth display sub-stage. Since the seventeenth driving sub-signal 026 and the sixteenth driving sub-signal 016 are in the same first display stage, the seventeenth driving sub-signal 026 may be sequentially at the consecutive display sub-stages. For example, the second voltage is at the first display sub-stage, the Vcom signal is at the second display sub-stage, the second voltage is at the third display sub-stage, and the Vcom is in the fourth display sub-stage.

Similar to at the first homogenization stage S1, the second homogenization stage S2, the third homogenization stage S3, and the fourth homogenization stage S5 described above, the durations of the driving signals at the same sub-stage of the fourth homogenization stage S5 are the same. Therefore, the durations of the display sub-stages of the sixteenth driving sub-signal 016 are t161, t162, t163, and t164, sequentially and respectively; and the durations of the display sub-stages of the seventeenth driving sub-signal 026 are t261, t262, t263, and t264, sequentially and respectively. As the same as in the previous embodiments, the duration of each sub-stage is set according to ΔT×N, where ΔT is determined by the period of the driving signal, N is a constant set manually as required, and N for the same sub-stage is the same. In an embodiment of the present disclosure, N for the first and third display sub-stages may be set to 16, and N for the second and fourth display sub-stages is set to 12, so that the durations of the first and third display sub-stages are 16×0.02 s, i.e. 0.32 s, and the durations of the second and fourth display sub-stages are 12×0.02 s, i.e. 0.24 s.

Meanwhile, the first display stage in the embodiment of the present disclosure is the same as the first homogenization stage S1, the second homogenization stage S2, the third homogenization stage S3, and the fourth homogenization stage S5, and the first display stage may be repeated after one first display stage is completed. The total number of times of execution of the first display stage may be set to M, which is a natural number, for example, in the embodiment of the present disclosure, M may be set to 3. In this way, the first display stage is performed for multiple times, and the microstructure 1 has a better effect of imaging.

It should be noted that, as the same as the display sub-stages in the first display stage, the durations of the driving signals at the same display sub-stage of the second display stage and the third display stage are the same. Therefore, the durations of the display sub-stages of the second display sub-stage S62 of the eighteenth driving sub-signal 036 are t371, t372, t373, and t374, sequentially and respectively; and the durations of the display sub-stages of the third display sub-stage S63 of the eighteenth driving sub-signal 036 are t381, t382, t383, and t384, sequentially and respectively. As the same as in the previous embodiments, the duration of each sub-stage is set according to ΔT×N, where ΔT is determined by the period of the driving signal, N is a constant set manually as required, and N for the same sub-stage is the same. In an embodiment of the present disclosure, N for the respective display stages of the second display stage are sequentially 9, 4, 53, and 10, and the duration thereof are 9×0.02 s, 4×0.02 s, 53×0.02 s, and 10×0.02 s, sequentially and respectively; N for the respective display stages of the third display stage are sequentially 4, 3, 37, and 3, and the duration thereof are 4×0.02 s, 3×0.02 s, 37×0.02 s, and 3×0.02 s, sequentially and respectively. In this way, it is realized that the microstructure 1 driven by the third driving signal 03 displays red.

Meanwhile, the second display stage in the embodiment according to the present disclosure is the same as the third display stage, and the second display stage or the third display stage may be repeated after one second display stage or one third display stage is completed. The total number of times of execution of the second display stage and the third display stage may be set to M1 and M2, respectively, both of which are natural numbers, for example, in the embodiment of the present disclosure, M1 may be set to 3 and M2 may be set to 2. In this way, the second display stage and the third display stage are performed multiple times, and the microstructure 1 has a better effect of imaging.

In some embodiments, the second display sub-stage S62 and the third display sub-stage S63 are sequentially after the first display sub-stage S61. That is, the microstructures 1 displaying white and black display first, and then the microstructure 1 displaying red displays. In this way, on one hand, the polarity of the red particles 6 is prevented from affecting the black particles 4, so that the microstructure 1 displaying black is not affected by the red particles 6 as much as possible; on the other hand, since the driving voltage of the red particles 6, i.e. the third voltage, is less than the first voltage, an effect of imaging of the particles in the microstructure 1 displaying red is inferior to an effect of imaging of the particles in the microstructures 1 displaying black and white, in the same driving stage. Therefore, the microstructure 1 displaying red is driven in the final stage, and the driving may be performed in two consecutive stages.

In some embodiments, as shown in FIG. 2, the color electronic paper further includes a controller 3 and a plurality of pixel driving circuits 2, and the controller 3 generates a control signal and a driving signal according to an image displayed by the color electronic paper in a display stage. The driving signals include a first driving signal 01, a second driving signal 02, and a third driving signal 03, and the pixel driving circuit 2 writes the driving signals into the corresponding pixel electrodes 11 according to the control signals.

In an embodiment according to the present disclosure, the controller determines the microstructures 1 displaying black, white, and red according to the image to be displayed. Then, the controller outputs a control signal and a driving signal to the pixel driving circuit 2 corresponding to the microstructure 1, where the control signal controls the corresponding pixel driving circuit to be turned on, and the corresponding driving signal is input to the corresponding pixel electrode 11. The driving signals include a first driving signal 01, a second driving signal 02 and a third driving signal 03 for controlling the microstructure 1 to display a corresponding color. In this way, an algorithm for generating the control signal in the controller is mature, and the frequency and the signal waveform of the generated driving signal and the control signal can be controlled, so that the displayed image can be switched by the color electronic paper.

In a second aspect, the present disclosure provides a color electronic paper, including: a plurality of microstructures 1, and a pixel driving circuit including a pixel electrode 11 and a common electrode 27. Each of the plurality of microstructures 1 includes black particles 4, white particles 5, and color particles. The polarities of the charges of the black particles 4 and the white particles 5 are opposite to each other, the polarities of the charges of the black particles 4 and the color particles are the same, and the charge-to-mass ratio of the black particles 4 is greater than that of the color particles. The color electronic paper further includes a controller and a plurality of pixel driving circuits, where the controller is configured to generate a control signal and a driving signal according to an image displayed by the color electronic paper in a display stage; the control signals are configured to control the turning on of the pixel driving circuit, the driving signals are configured to drive the black particles 4, the white particles 5 and the color particles in the microstructure 1; and the pixel driving circuit 2 is configured to write a driving signal into the pixel electrode 11 corresponding to the pixel driving circuit 2 under the control of a control signal.

In an embodiment according to the present disclosure, the color particles include, but are not limited to, red particles. In the embodiment according to the present disclosure, as an example for description, the color particles are red particles 6. The charges of black particles 4 have a polarity opposite to that of the charges of the white particles 5 and the same as that of the charges of the red particles 6, and the charge-to-mass ratio of the black particles 4 is greater than that of the red particles 6. The controller 2 generates a control signal and a driving signal according to an image to be displayed by the color electronic paper, where the control signal is used for controlling the turning on of a pixel driving circuit 2 electrically connected to the microstructure 1 for displaying, and the driving signal is used for displaying the image. At the display stage, the controller controls the pixel driving circuit to be turned on, the pixel driving circuit turns on to write a corresponding driving signal into the pixel electrode 11 of the microstructure 1, and the common electrodes 27 of the respective microstructures 1 are connected together, and generally are grounded (0V), or set to a constant voltage value. The driving signal to the pixel electrode 11 forms an electric field together with the common electrode 27, so that the charged particles in the electric field move. The charged particles in the microstructure 1 can be controlled to move to a specific position by the preset waveform of the driving signal, so that an image is displayed.

In some embodiments, the pixel driving circuit includes a first transistor 9 and a second transistor 10. A first electrode of the first transistor 9 is connected to a data line, a second electrode of the first transistor 9 is connected to a first electrode of the second transistor 10, a second electrode of the second transistor 10 is connected to the pixel electrode 11, and control electrodes of the first transistor 9 and the second transistor 10 are connected to a gate line.

Figure 15:
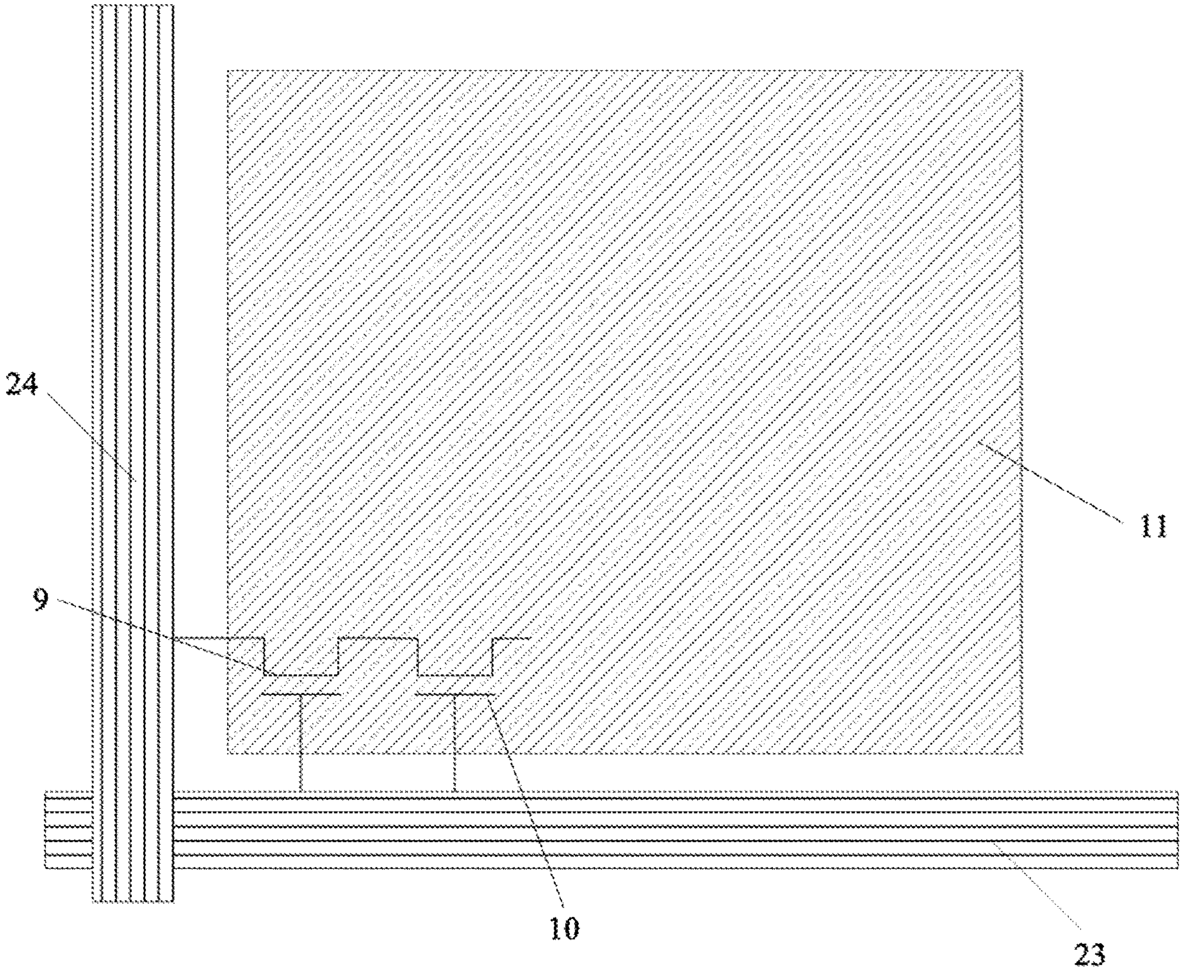
FIG. 15 is a schematic top view of a pixel driving circuit according to the present disclosure.
Figure 16:
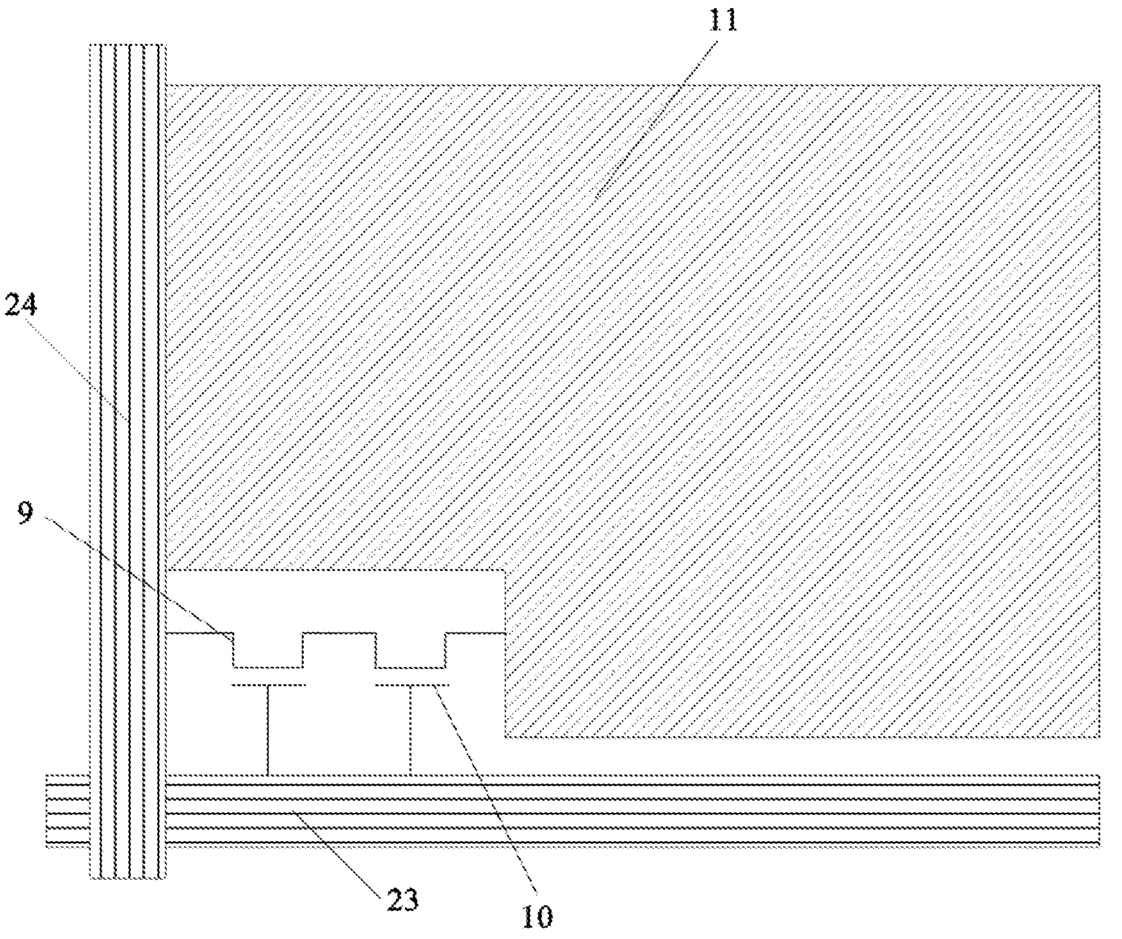
FIG. 16 is a schematic top view of another pixel driving circuit according to the present disclosure.

In an embodiment according to the present disclosure, as shown in FIGS. 15 and 16, since the first electrode of the first transistor 9 is connected to the data line, the second electrode of the first transistor 9 is connected to the first electrode of the second transistor 10, the second electrode of the second transistor 10 is connected to the pixel electrode 11, and the control electrodes of the first transistor 9 and the second transistor 10 are connected to the gate line, when the control signal on the gate line controls the first transistor 9 and the second transistor 10 to be turned on, the first transistor 9 and the second transistor 10 are electrically connected in series, by which the driving signal written by the data line to the first electrode of the first transistor 9 is transmitted to the second electrode of the second transistor 10.

In this way, on one hand, the process of the pixel driving circuit is mature, and the yield of manufacturing is high; on the other hand, two transistors are connected in series when turned on, so that the leakage current of the pixel driving circuit is smaller, which is beneficial for improving the quality of the driving signal flowing through the pixel driving circuit, and improving the quality of display effect.

Figure 17:
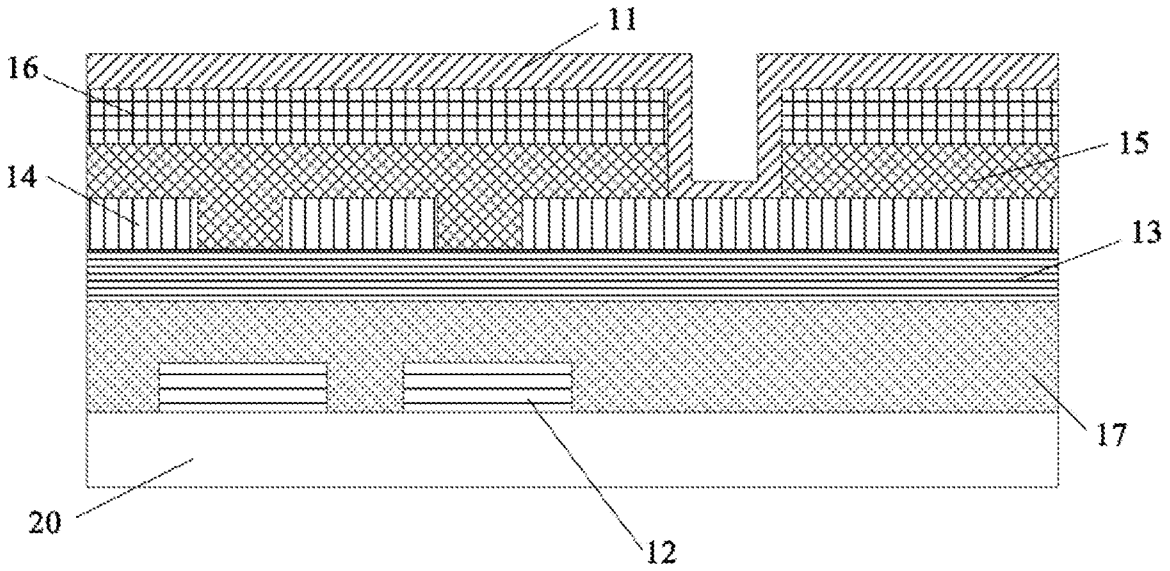
FIG. 17 is a cross-sectional view of a pixel driving circuit according to the present disclosure.

In some embodiments, an orthographic projection of the pixel electrode 11 on the base substrate completely covers an orthographic projection of the first transistor 9 and the second transistor 10 on the base substrate. As shown in FIG. 15, the pixel electrode 11 completely covers the first transistor 9 and the second transistor 10. Specifically, FIG. 17 is a cross-sectional view of the pixel driving circuit 2 according to the present disclosure. The pixel driving circuit 2 includes a base substrate, and a first metal layer 12, an active layer 13, a second metal layer 14, a first insulating layer 15, a second insulating layer 17, a first planarization layer 16, and a first transparent conductive layer, which are sequentially arranged on the base substrate. The first metal layer 12 includes the gates of the first transistor 9 and the second transistor 10; the active layer 13 includes an active layer 13 of the first transistor 9 and an active layer 13 of the second transistor 10, and the active layer 13 of the first transistor 9 and the active layer 13 of the second transistor 10 are of an integral structure in the present disclosure; the second metal layer 14 includes the source and drain of the first transistor 9 and the source and drain of the second transistor 10; a first via penetrating through the first insulating layer 15 and the first planarization layer 16 is provided in the first insulating layer 15 and the first planarization layer 16, which are sequentially arranged on the first metal layer 12, the first transparent conductive layer serves as a pixel electrode 11, and is electrically connected to the drain of the first transistor 9 or the second transistor 10 through the first via, and the pixel electrode 11 completely covers the first transistor 9 and the second transistor 10. In this way, the pixel circuit with such a structure is mature in process and has a high yield. Meanwhile, the pixel electrode 11 completely covers the pixel circuit of the transistor, which is beneficial for adapting to a display substrate with a microstructure 1 with a larger working temperature range, for example, a display substrate with a working temperature range of 0° C. to 40° C.

Figure 18:
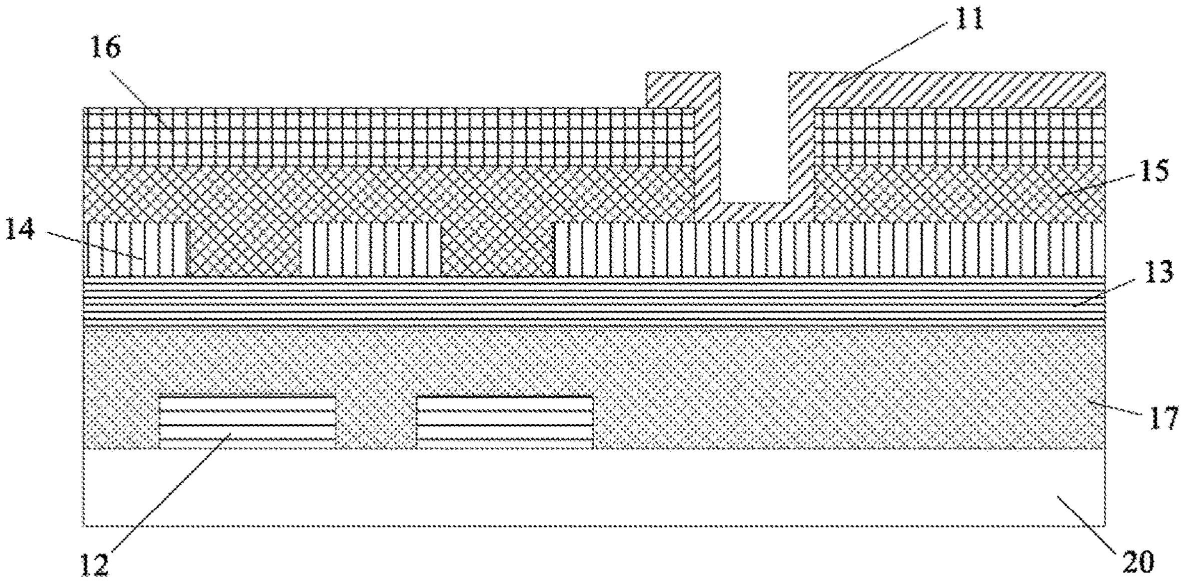
FIG. 18 is a cross-sectional view of another pixel driving circuit according to the present disclosure.

Meanwhile, in some embodiments, as shown in FIG. 16, an orthographic projection of the pixel electrode 11 on the base substrate is at least partially non-overlapping with an orthographic projection of the first transistor 9 and the second transistor 10 on the base substrate. Specifically, as shown in FIG. 18, the structure of the pixel driving circuit is similar to that of the pixel driving circuit in the above embodiment, and therefore, the detailed description thereof is omitted here. As shown in FIG. 18, the pixel electrode 11 in the present disclosure does not completely cover the first transistor 9 and the second transistor 10. In this way, the pixel circuit with such a structure can be realized only through four masking and photolithography processes, and the manufacturing cost and the design cost are greatly reduced. Meanwhile, the influence among all the microstructures 1 in the display panel, which is matched with the pixel circuit and provided with the microstructures 1, is low, so that the effect of imaging of the electronic paper is better.

In a third aspect, an embodiment of the present disclosure provides a non-transitory computer-readable medium storing a computer program which, when being executed by a processor, implements any one of the above-mentioned methods of driving a color electronic paper.

It will be understood by one of ordinary skill in the art that all or some of the steps of the methods, function modules/units in the systems or apparatus disclosed above may be implemented as software, firmware, hardware, or suitable combinations thereof. In a hardware implementation, a division between the function modules/units mentioned in the above description does not necessarily correspond to a division of physical components. For example, one physical component may have a plurality of functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on a computer-readable medium, which may include a computer storage medium (a non-transitory medium) and a communication medium (a transitory medium).

As is well known to one of ordinary skill in the art, the term "computer storage medium" includes volatile and nonvolatile, removable and non-removable media implemented in any method or technology for storage of information (such as computer-readable instructions, data structures, program modules or other data). The computer storage medium includes, but is not limited to, RAM, ROM, EPROM, flash memory or other memory technologies, CD-ROM, digital versatile disc (DVD) or other optical disk storage, magnetic cassette, magnetic tape, magnetic disk storage or other magnetic storage apparatuses, or any other medium which can be used to store the desired information and can be accessed by a computer. In addition, as is well known to one of ordinary skill in the art, the communication medium typically contains computer-readable instructions, data structures, program modules or other data in a modulated data signal such as a carrier wave or other transport mechanism, and includes any information delivery medium.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and essence of the present disclosure, and such modifications and improvements are also considered to be within the protection scope of the present disclosure.

What is claimed is:

1. A driving method of an electronic paper display apparatus, wherein the electronic paper display apparatus comprises a controller, a base substrate, a plurality of pixel driving circuits on the base substrate, and an electronic paper film, wherein the electronic paper film comprises a plurality of microstructures, and the plurality of pixel driving circuits comprises a common electrode and a plurality of pixel electrodes among the plurality of microstructures; each of the plurality of microstructures comprises black particles, white particles, and color particles; wherein charges of the black particles have a polarity opposite to a polarity of charges of the white particles and the same as a polarity of charges of the color particles, and a charge-to-mass ratio of the black particles is greater than a charge-to-mass ratio of the color particles; wherein the driving method comprises:

inputting, by the controller, a first driving signal to the pixel electrode of the pixel driving circuit corresponding to a pixel which is required to display black, according to an image to be displayed; and inputting, by the controller, a second driving signal to the pixel electrode of the pixel driving circuit corresponding to a pixel which is required display white, according to the image to be displayed; wherein a driving stage of the electronic paper display apparatus comprises a first homogenization stage, and the first homogenization stage comprises a plurality of homogenization sub-stages; at a last one of the plurality of homogenization sub-stages, the first driving signal comprises a first driving sub-signal, and the second driving signal comprises a second driving sub-signal; and a voltage of the first driving sub-signal has a polarity opposite to the polarity of the black particles; and a voltage of the second driving sub-signal has a polarity opposite to the polarity of the white particles, wherein the driving method further comprises: inputting, by the controller, a third driving signal to the pixel electrode of the pixel driving circuit corresponding to a pixel which is required to display a color, according to the image to be displayed; wherein at the last one of the plurality of homogenization sub-stages of the first homogenization stage, the third driving signal comprises a third driving sub-signal; and a voltage of the third driving sub-signal has a polarity opposite to the polarity of the color particles, wherein starting moments of driving of the plurality of homogenization sub-stages of the first homogenization stage sequentially increases, and the plurality of homogenization sub-stages are a first homogenization sub-stage, a second homogenization sub-stage, a third homogenization sub-stage and a fourth homogenization sub-stage; the first driving signal further comprises a nineteenth driving sub-signal at the first homogenization sub-stage and the second homogenization sub-stage; the second driving signal further comprises a twenty-first driving sub-signal at the first homogenization sub-stage and the second homogenization sub-stage; and the third driving signal further comprises a twenty-third driving sub-signal at the first homogenization sub-stage and the second homogenization sub-stage; and the nineteenth driving sub-signal, the twenty-first driving sub-signal and the twenty-third driving sub-signal each comprise pulse signals with positive and negative voltages sequentially altered.

2. The driving method according to claim 1, wherein the driving stage of the electronic paper display apparatus further comprises a second homogenization stage, and the second homogenization stage is before the first homogenization stage; the first driving signal further comprises a fourth driving sub-signal at the second homogenization stage, the second driving signal further comprises a fifth driving sub-signal at the second homogenization stage, and the third driving signal further comprises a sixth driving sub-signal at the second homogenization stage; and the fourth driving sub-signal, the fifth driving sub-signal, and the sixth driving sub-signal each comprise a first voltage and a second voltage; wherein an effective duration of the second voltage is greater than an effective duration of the first voltage.

3. The driving method according to claim 2, wherein the driving stage of the electronic paper display apparatus further comprises a third homogenization stage, and the third homogenization stage is between the second homogenization stage and the first homogenization stage; the first driving signal further comprises a seventh driving sub-signal at the third homogenization stage, the second driving signal further comprises an eighth driving sub-signal at the third homogenization stage, and the third driving signal further comprises a ninth driving sub-signal at the third homogenization stage; and the seventh driving sub-signal, the eighth driving sub-signal and the ninth driving sub-signal each comprise pulse signals with positive and negative voltages sequentially alternated.

4. The driving method according to claim 3, wherein in the pulse signals of each of the seventh driving sub-signal, the eighth driving sub-signal, and the ninth driving sub-signal, an effective duration of the negative voltage is greater than an effective duration of the positive voltage.

5. The driving method according to claim 1, wherein the driving stage of the electronic paper display apparatus further comprises a fourth homogenization stage, and the fourth homogenization stage is before a display stage of the electronic paper display apparatus; the first driving signal further comprises a tenth driving sub-signal at the fourth homogenization stage, the second driving signal further comprises an eleventh driving sub-signal at the fourth homogenization stage, and the third driving signal further comprises a twelfth driving sub-signal at the fourth homogenization stage;

the tenth driving sub-signal and the eleventh driving sub-signal each comprise pulse signals with negative and positive voltages sequentially alternated; the pulse signals of the twelfth driving sub-signal and the tenth driving sub-signal are inverse to the pulse signals of the tenth driving sub-signal; and a voltage of the common electrode of the pixel driving circuit comprises pulse signals with negative and positive voltages sequentially alternated, and an absolute value of the voltage the common electrode is the same as an absolute value of the pixel electrode, in a same pixel driving circuit.

6. The driving method according to claim 5, wherein the driving stage of the electronic paper display apparatus further comprises a balance stage, and the balance stage is before the fourth homogenization stage; the first driving signal further comprises a thirteenth driving sub-signal at the balance stage, the second driving signal further comprises a fourteenth driving sub-signal at the balance stage, and the third driving signal further comprises a fifteenth driving sub-signal at the balance stage; and the thirteenth driving sub-signal and the fourteenth driving sub-signal are capable of driving the white particles in the microstructure back to initial positions; and the fifteenth driving sub-signal is capable of driving the white particles and the color particles in the microstructures back to initial positions.

7. The driving method according to claim 5, wherein the display stage comprises a first display sub-stage, a second display sub-stage, and a third display sub-stage; the first driving signal further comprises a sixteenth driving sub-signal at the first display sub-stage, the second driving signal further comprises a seventeenth driving sub-signal at the first display sub-stage, and the third driving signal further comprises an eighteenth driving sub-signal at the second display sub-stage and the third display sub-stage;

the sixteenth driving sub-signal comprises a first voltage and a zero voltage which are alternately arranged;

the seventeenth driving sub-signal comprises the zero voltage and a second voltage which are alternately arranged; and the eighteenth driving sub-signal comprises the second voltage, the zero voltage, and a third voltage; wherein an effective duration of the third voltage is greater than an effective duration of the second voltage.

8. The driving method according to claim 7, wherein the second display sub-stage and the third display sub-stage are sequentially after the first display sub-stage.

9. The driving method according to claim 1, wherein in the pulse signals of each of the nineteenth driving sub-signal, the twenty-first driving sub-signal, and the twenty-third driving sub-signal, a duration of the positive voltage is less than a duration of the negative voltage.

10. The driving method according to claim 1, wherein the first driving signal further comprises a twentieth driving sub-signal at the third homogenization sub-stage; the second driving signal further comprises a twenty-second driving sub-signal at the third homogenization sub-stage; and the third driving signal further comprises a twenty-fourth driving sub-signal at the third homogenization sub-stage; and the twentieth driving sub-signal, the twenty-second driving sub-signal, and the twenty-fourth driving sub-signal each comprise a second voltage.

11. The driving method according to claim 1, wherein the microstructure comprises a microcup structure and a microcapsule structure.

12. A non-transitory computer-readable medium storing a computer program which, when being executed by a processor, implements the method according to claim 1.

13. An electronic paper display apparatus, comprising a controller, a base substrate, a plurality of pixel driving circuits on the base substrate, and an electronic paper film, wherein the electronic paper film comprises a plurality of microstructures; each of the plurality of microstructures comprises black particles, white particles, and color particles; wherein charges of the black particles have a polarity opposite to a polarity of charges of the white particles and the same as a polarity of charges of the color particles, and a charge-to-mass ratio of the black particles is greater than a charge-to-mass ratio of the color particles;

the controller is configured to generate a control signal and a driving signal, according to an image displayed by the color electronic paper at a display stage; the control signal is configured to control a pixel driving circuit to be turned on, the driving signal is configured to drive the black particles, the white particles and the color particles in the microstructure, wherein the controller is configured to, according to an image to be displayed, input a first driving signal to the pixel electrode of the pixel driving circuit corresponding to a pixel which is required to display black, input a second driving signal to the pixel electrode of the pixel driving circuit corresponding to a pixel which is required display white, and input a third driving signal to the pixel electrode of the pixel driving circuit corresponding to a pixel which is required to display a color, according to the image to be displayed; wherein a driving stage of the electronic paper display apparatus comprises a first homogenization stage, and the first homogenization stage comprises a plurality of homogenization sub-stages; at a last one of the plurality of homogenization sub-stages, the first driving signal comprises a first driving sub-signal, the second driving signal comprises a second driving sub-signal, and the third driving signal comprises a third driving sub-signal; a voltage of the first driving sub-signal has a polarity opposite to the polarity of the black particles; a voltage of the second driving sub-signal has a polarity opposite to the polarity of the white particles; and a voltage of the third driving sub-signal has a polarity opposite to the polarity of the color particles; wherein starting moments of driving of the plurality of homogenization sub-stages of the first homogenization stage sequentially increases, and the plurality of homogenization sub-stages are a first homogenization sub-stage, a second homogenization sub-stage, a third homogenization sub-stage and a fourth homogenization sub-stage; the first driving signal further comprises a nineteenth driving sub-signal at the first homogenization sub-stage and the second homogenization sub-stage; the second driving signal further comprises a twenty-first driving sub-signal at the first homogenization sub-stage and the second homogenization sub-stage; and the third driving signal further comprises a twenty-third driving sub-signal at the first homogenization sub-stage and the second homogenization sub-stage; and the nineteenth driving sub-signal, the twenty-first driving sub-signal and the twenty-third driving sub-signal each comprise pulse signals with positive and negative voltages sequentially altered; and the pixel driving circuit comprises a common electrode and a pixel electrode among the plurality of microstructures, and is configured to be written the driving signal into the pixel electrode under the control of the control signal.

14. The electronic paper display apparatus according to claim 13, wherein the pixel driving circuit further comprises a first transistor and a second transistor; a first electrode of the first transistor is connected to a data line, a second electrode of the first transistor is connected to a first electrode of the second transistor, a second electrode of the second transistor is connected to the pixel electrode, and control electrodes of the first transistor and the second transistor are connected to a gate line.

15. The electronic paper display apparatus according to claim 14, wherein an orthographic projection of the pixel electrode on the base substrate completely covers an orthographic projection of the first transistor and the second transistor on the base substrate.

16. The electronic paper display apparatus according to claim 14, wherein an orthographic projection of the pixel electrode on the base substrate is at least partially non-overlapping with an orthographic projection of the first transistor and the second transistor on the base substrate.

17. The electronic paper display apparatus according to claim 13, wherein the microstructure comprises a microcup structure and a microcapsule structure.

* * * * *